United States Patent
Inoue et al.

(10) Patent No.: US 8,174,474 B2
(45) Date of Patent: May 8, 2012

(54) LIQUID CRYSTAL DISPLAY APPARATUS AND METHOD FOR DRIVING THE SAME

(75) Inventors: Yuichi Inoue, Atsugi (JP); Katsutoshi Kobayashi, Ise (JP); Tetsuya Kobayashi, Sagamihara (JP); Hidehiko Yamaguchi, Tsu (JP); Seiji Sutoh, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 745 days.

(21) Appl. No.: 12/298,716

(22) PCT Filed: Apr. 5, 2007

(86) PCT No.: PCT/JP2007/057648
§ 371 (c)(1),
(2), (4) Date: Dec. 9, 2008

(87) PCT Pub. No.: WO2007/125738
PCT Pub. Date: Nov. 8, 2007

(65) Prior Publication Data
US 2009/0167665 A1    Jul. 2, 2009

(30) Foreign Application Priority Data

Apr. 28, 2006  (JP) ................. 2006-127054

(51) Int. Cl.
G09G 3/36 (2006.01)
G06F 3/038 (2006.01)
(52) U.S. Cl. ............. 345/94; 345/87; 345/204; 345/208
(58) Field of Classification Search ............. 345/204, 345/87, 208–209, 94–96
See application file for complete search history.

(56) References Cited

U.S. PATENT DOCUMENTS

| | | | |
|---|---|---|---|
| 5,640,174 A | 6/1997 | Kamei et al. | |
| 5,666,133 A | 9/1997 | Matsuo et al. | |
| 5,903,234 A * | 5/1999 | Kimura | 341/144 |
| 6,344,842 B1 | 2/2002 | Hebiguchi | |
| 6,873,319 B2 * | 3/2005 | Inoue et al. | 345/204 |
| 6,992,718 B1 * | 1/2006 | Takahara | 348/333.09 |
| 7,050,027 B1 * | 5/2006 | Macrae | 345/87 |
| 7,436,383 B2 * | 10/2008 | Chen et al. | 345/94 |
| 7,768,489 B2 * | 8/2010 | Liu et al. | 345/94 |
| 2001/0048412 A1 | 12/2001 | Nakanishi et al. | |
| 2002/0140653 A1 * | 10/2002 | Koyama | 345/87 |

(Continued)

FOREIGN PATENT DOCUMENTS

JP    5-72997 A    3/1993

(Continued)

*Primary Examiner* — Bipin Shalwala
*Assistant Examiner* — Hang Lin
(74) *Attorney, Agent, or Firm* — Birch, Stewart, Kolasch & Birch, LLP

(57) ABSTRACT

A voltage having the positive polarity and a voltage having the negative polarity are alternately applied to a pixel between a counter electrode and a pixel electrode. A counter electrode voltage (Vcom) generating circuit or a source signal generating section is provided each of which controls effective voltages to be applied to the pixel for an identical tone so that an effective voltage having the positive polarity and an effective voltage having the negative polarity are asymmetrically applied to the pixel for all of the tones which can be displayed. The counter electrode voltage (Vcom) generating circuit or the source signal generating section shifts a counter electrode voltage Vcom-A or a source voltage by 0.3 V or more from a voltage causing the effective voltages to be symmetrically applied to the pixel.

21 Claims, 14 Drawing Sheets

U.S. PATENT DOCUMENTS

| | | |
|---|---|---|
| 2003/0006950 A1 | 1/2003 | Saishu et al. |
| 2003/0231154 A1 | 12/2003 | Yeo et al. |
| 2005/0012734 A1* | 1/2005 | Johnson et al. ............... 345/211 |
| 2006/0012554 A1 | 1/2006 | Saishu et al. |

FOREIGN PATENT DOCUMENTS

| | | |
|---|---|---|
| JP | 5-165431 A | 7/1993 |
| JP | 5-119742 A | 9/1993 |
| JP | 7-20440 | 1/1995 |
| JP | 7-92937 | 4/1995 |
| JP | 7-199867 A | 8/1995 |
| JP | 8-278515 | 10/1996 |
| JP | 9-152627 A | 6/1997 |
| JP | 10-268259 A | 10/1998 |
| JP | 2001/337310 | 12/2001 |
| JP | 2002-251170 A | 9/2002 |
| JP | 2003-5151 A | 1/2003 |
| JP | 2003-295843 | 10/2003 |
| JP | 2004-69886 A | 3/2004 |

* cited by examiner

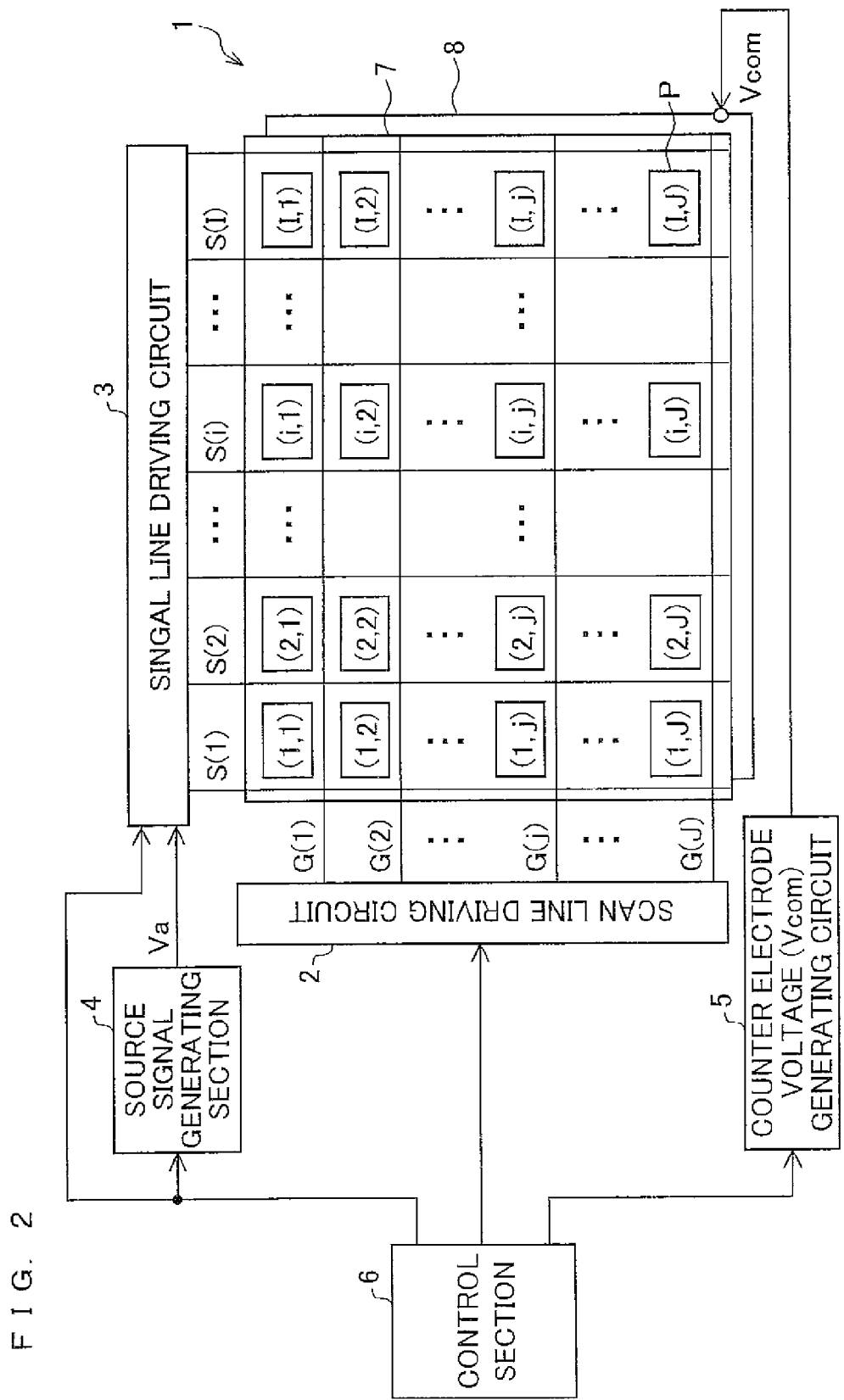
F I G. 2

F I G. 3
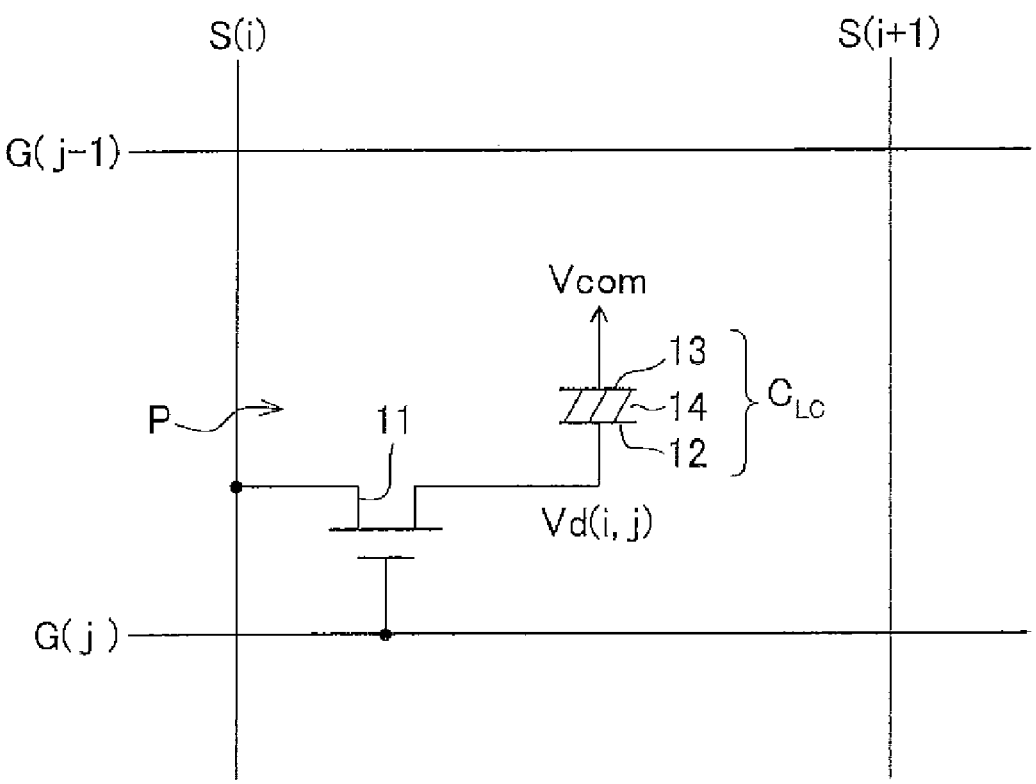

F I G. 8 (a)
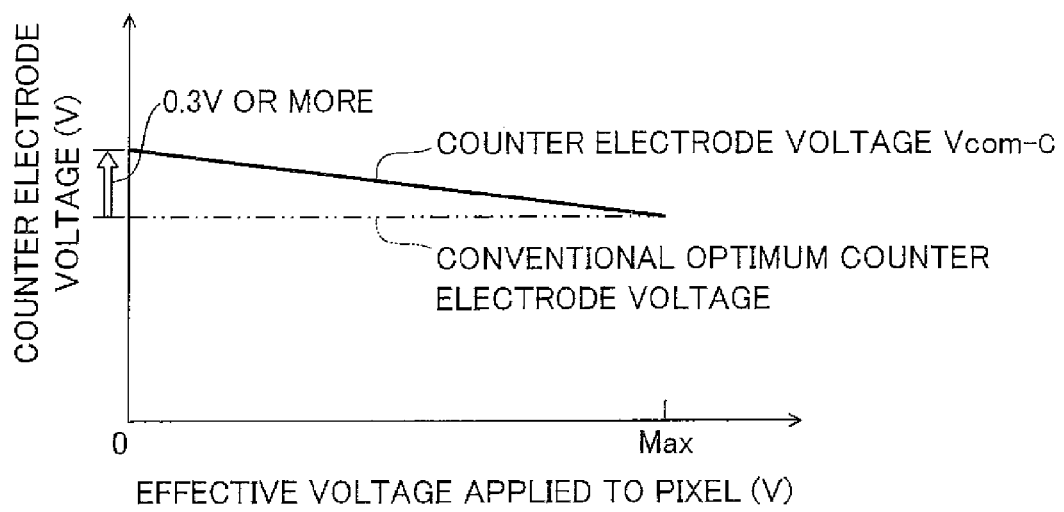
F I G. 8 (b)
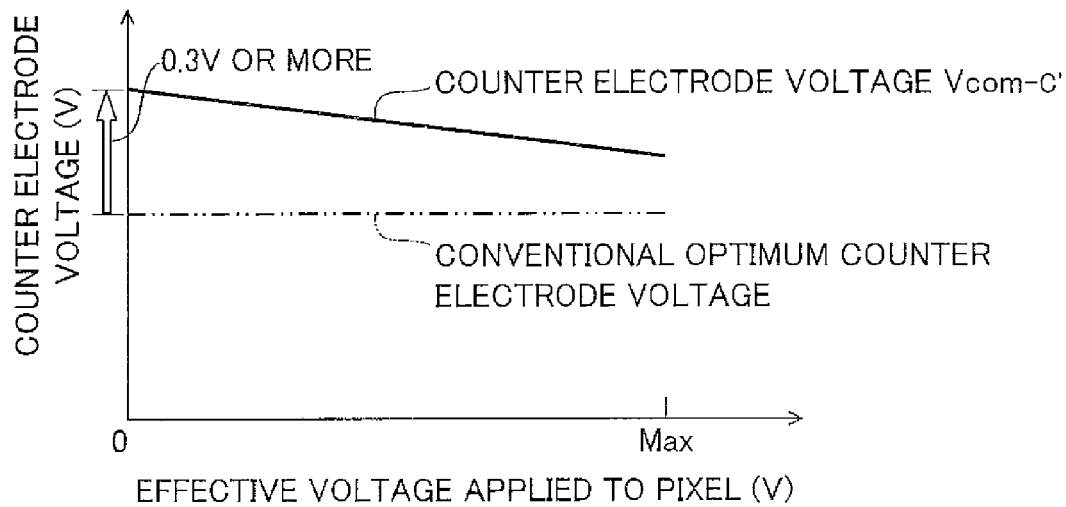

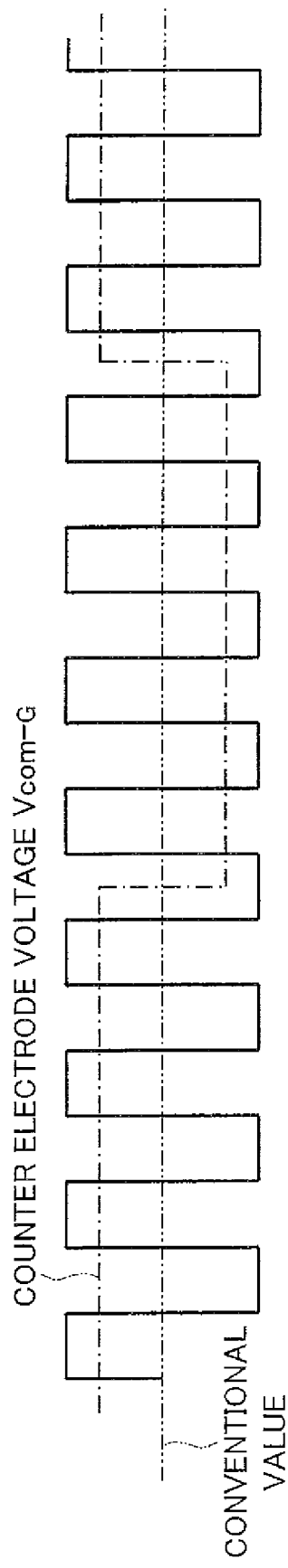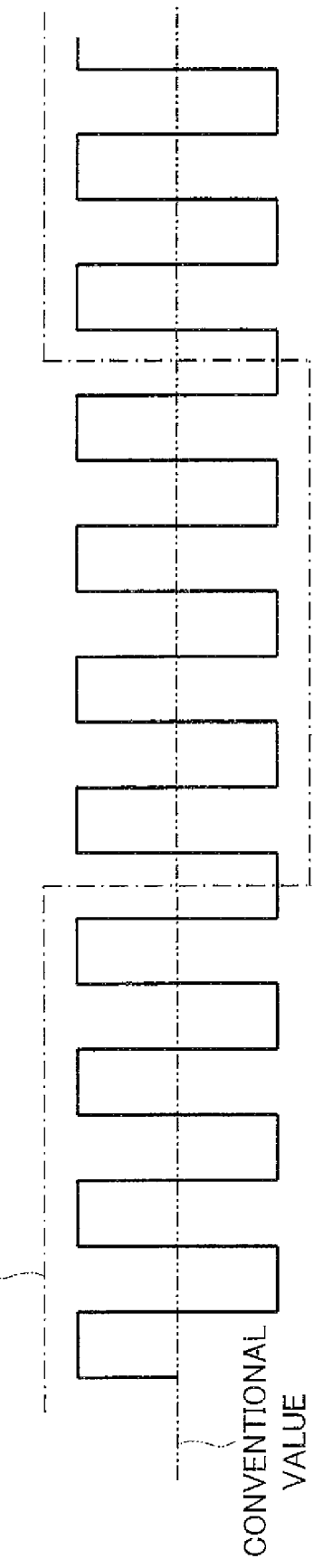

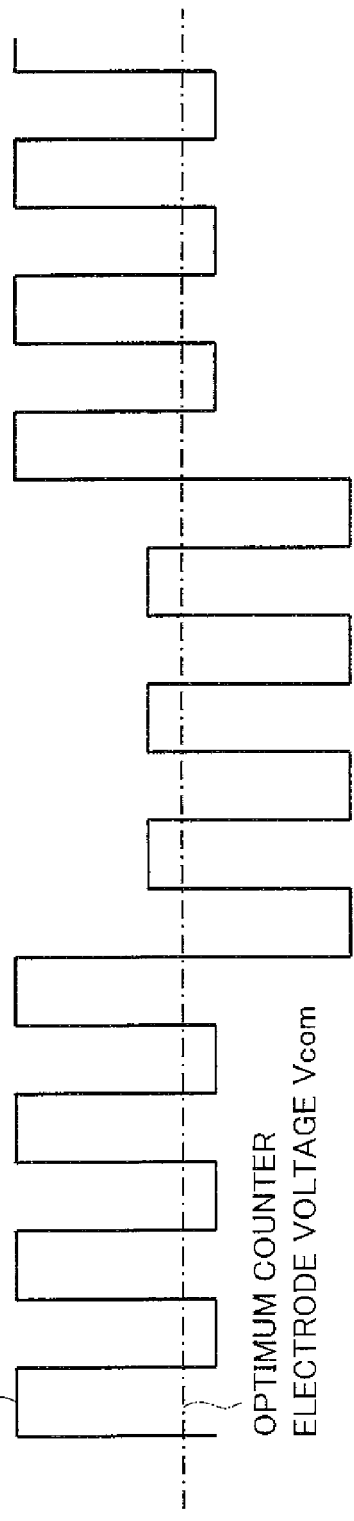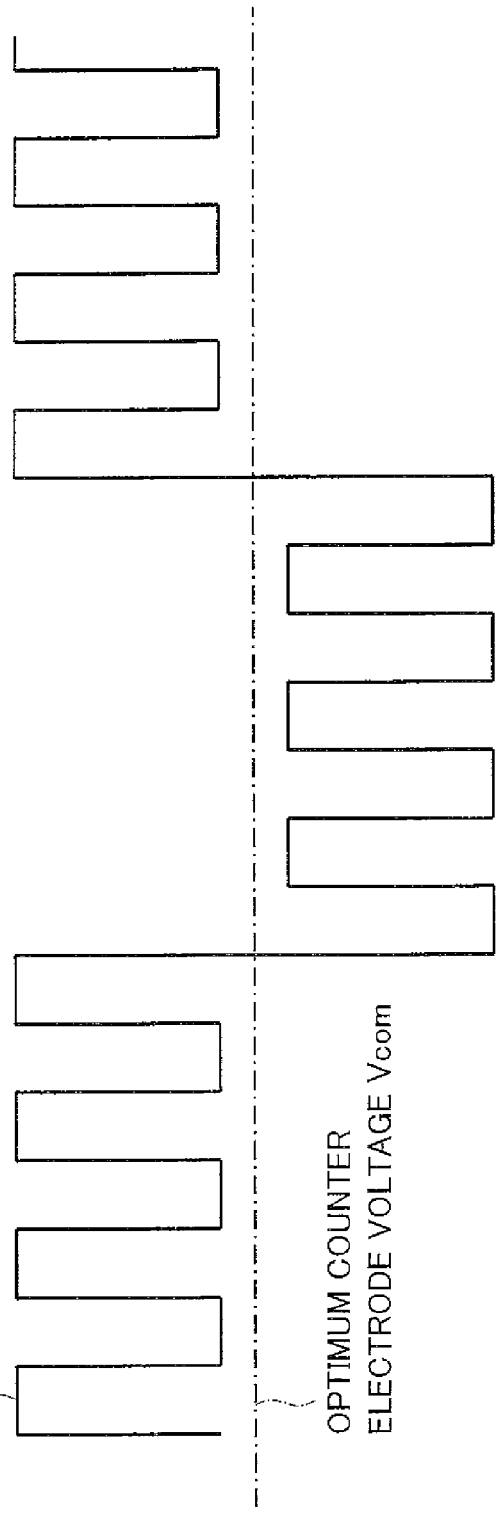

FIG. 17
(a) 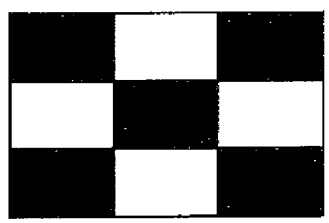
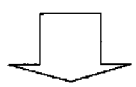 AFTER HAVING BEEN DISPLAYED
FOR A LONG TIME
CHANGED INTO A HALF TONE DISPLAY
(b) 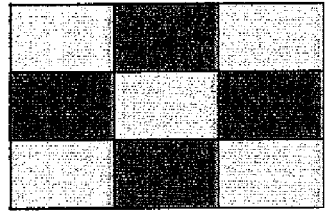
FIG. 18
(a) 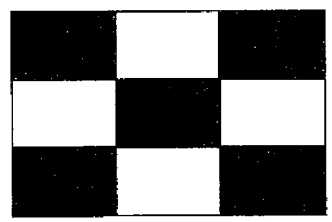
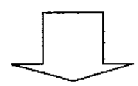 AFTER HAVING BEEN DISPLAYED
FOR A LONG TIME
CHANGED INTO A HALF TONE DISPLAY
(b) 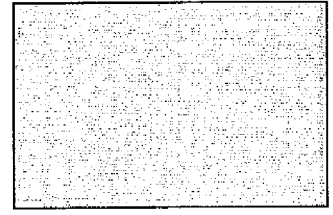

LIQUID CRYSTAL DISPLAY APPARATUS AND METHOD FOR DRIVING THE SAME

TECHNICAL FIELD

The present invention relates to a liquid crystal display apparatus driven by a polarity inversion driving in which a voltage having the positive polarity and a voltage having the negative polarity are alternately applied to a pixel between a counter electrode and a pixel electrode and to method for driving the same.

BACKGROUND ART

A conventional liquid crystal display apparatus causes the following problem. Specifically, in a case where, after a fixed pattern, in which a black display includes white square displays as illustrated in FIG. 15 (a), is displayed for a long time, it is changed into another display, for example, an entire half tone display, retentions occur at edge parts of the white square displays as burnings as illustrated in FIG. 15 (b). This allows a degradation in display quality. Note that FIG. 15 (b) shows an initial stage at which changing of displays are carried out and so a burning emerges only on one side of each of the white squares. After elapse of a long period of time, burnings emerge on four sides of the white squares.

To deal with this burning problem, for example, patent document 1 discloses an arrangement in which a counter electrode electric potential is adjusted to be a pixel electrode center electric potential (an electric potential of a center part of a pixel electrode) as illustrated in FIG. 16. Namely, a voltage having the positive polarity and a voltage having the negative polarity are alternately applied to a pixel between a counter electrode and a pixel electrode. As such, the voltage having the positive polarity and the voltage having the negative polarity, which have an identical effective voltage for an identical tone value, are applied to the pixel between the counter electrode and the pixel electrode, and so become symmetric with respect to the counter electrode voltage. This is carried out for all of the tones that can be displayed.

For example, patent document 2 discloses another conventional arrangement in which a direct-current component is removed to deal with the burning problem.

Patent Document 1: Japanese Publication for Unexamined Patent Application, Tokukaihei, No. 5-165431 (date of publication: Jul. 2, 1993)

Patent Document 2: Japanese Publication for Unexamined Patent Application, Tokukai, No. 2002-251170 (date of publication: Sep. 6, 2002)

However, the conventional liquid crystal display apparatus and methods for driving the same are only for overcoming the problem of a plane burning, and still have a problem that an edge burning which would occur when a display of a fixed pattern, after having been displayed for a long time, is changed into a half tone display.

The present invention is made in view of the problem and an object of the present invention is to provide a liquid crystal display apparatus and a method for driving the same which can prevent an edge burning which would occur when the display of a fixed pattern, after having been displayed for a long time, is changed into a half tone image.

DISCLOSURE OF INVENTION

As a result of diligent and various studies, the inventors of the present invention confirmed that this phenomenon was caused because impurities inside a display panel moved in lateral directions in a black display in a normally black mode, for example, and were accumulated at a boundary between the black display and a white display, and accomplished the present invention based on the finding.

Namely, for example, when voltages to be applied to the pixel for the black display are low, an electrical field becomes weak in a cell thickness (vertical) direction. This appears to cause that the impurities move in lateral directions easily in the black display, thereby resulting in the edge burning at the boundary between the black display and the white display which has a strong electric field. In a normally white mode, voltages to be applied to a pixel for a white display are low, and impurities move in lateral directions in a white display and are accumulated at a boundary between a black display and the white display, thereby resulting in the edge burning.

Therefore, it is possible to alleviate the edge burning by increasing the voltages to be applied to the pixel because the electric field becomes strong in the cell thickness direction and the impurities become less likely to move in lateral directions.

To attain the object, a liquid crystal display apparatus of the present invention in which a voltage having the positive polarity and a voltage having the negative polarity are alternately applied to a pixel between a counter electrode and a pixel electrode, including: an effective voltage control section that controls effective voltages for an identical tone so that an effective voltage having a positive polarity and an effective voltage having a negative polarity have asymmetrical values to be applied to the pixel for all of tones which can be displayed, wherein the effective voltage control section shifts a counter electrode voltage or a source voltage by 0.3 V or more from a voltage causing the effective voltages in the positive and the negative polarity to be symmetrically applied to the pixel.

To attain the object, a method for driving a liquid crystal display apparatus in which a voltage having a positive polarity and a voltage having a negative polarity are alternately applied to a pixel between a counter electrode and a pixel electrode, including the steps of: controlling effective voltages for an identical tone so that an effective voltage having the positive polarity and an effective voltage having the negative polarity have asymmetrical values to be applied to the pixel for all of tones which can be displayed; and shifting a counter electrode voltage or a source voltage by 0.3 V or more from a voltage causing the effective voltages in the positive polarity and the negative polarity to be symmetrically applied to the pixel.

In the present invention, the effective voltage is an actual voltage to be applied to the pixel after having been affected by potential fluctuation of a gate bus line. Specifically, in a TFT (Thin Film Transistor), for example, voltages supplied from a circuit or a source driver to a pixel electrode, i.e. an applied voltage is affected by voltage fluctuation of a gate bus line which generates a parasitic capacitance of a pixel. Accordingly, the voltage affected by the voltage fluctuation of the gate bus line becomes the effective voltage to be applied to the pixel.

Therefore, in the present invention, "the effective voltage having the positive polarity and the effective voltage having the negative polarity are symmetrically applied to the pixel" means that (i) an emergence of a flicker (flicker caused by a difference of the effective voltages in the positive and negative polarities to be applied to the pixel) is minimum; (ii) either a luminance or a transmittance is minimum in the normally black mode; or (iii) either a luminance or a transmittance is maximum in the normally white mode.

According to the invention, the effective voltages for an identical tone are controlled so that the effective voltage having the positive polarity and the effective voltage having the negative polarity are asymmetrically applied to the pixel between the counter electrode and the pixel electrode for all of the tones which can be displayed.

With this arrangement, for example, voltages to be applied to the pixel for the black display in the normally black mode become higher than those conventionally applied. This causes the electric filed to become strong in the cell thickness (vertical) direction. As a result, it is possible to prevent the movement of the impurities in lateral directions in the liquid crystal display panel, which leads the edge burning to be less likely to occur. In the normally white mode, voltages to be applied to the pixel for the white display become higher than those conventionally applied. Therefore, the edge burning is less likely to occur, like the case of the normally black mode.

Also, a shift amount which less likely to cause the edge burning is 0.3 V or more according to experiments. Therefore, the edge burning surly becomes less likely to occur by shifting either the counter electrode voltage or the source voltage by 0.3 V or more from the voltage causing the effective voltage having the positive polarity and the effective voltage having the negative polarity to be symmetrically applied to the pixel (see the FIG. 4).

As a result, it is possible to provide a liquid crystal display apparatus and a method for driving the same which can prevent the edge burning, which would occur when a fixed pattern, after having been displayed for a long time, is changed to a half tone display.

Further, to attain the object, a liquid crystal display apparatus of the present invention in which a voltage having a positive polarity and a voltage having a negative polarity are alternately applied to a pixel between a counter electrode and a pixel electrode, including: an effective voltage control section that controls effective voltages for an identical tone so that an effective voltage having the positive polarity and an effective voltage having the negative polarity have asymmetrical values to be applied to the pixel, for the effective voltages of not more than a first effective voltage which is lower than half of a maximum effective voltage, wherein the effective voltage control section shifts a counter electrode voltage or a source voltage by 0.3 V or more from a voltage causing the effective voltages in the positive polarity and the negative polarity to be symmetrically applied to the pixel, for the effective voltages of not more than the first effective voltage.

Further, to attain the object, a method for driving a liquid crystal display apparatus in which a voltage having a positive polarity and a voltage having a negative polarity are alternately applied to a pixel between a counter electrode and a pixel electrode, including the steps of: controlling effective voltages for an identical tone so that an effective voltage having the positive polarity and an effective voltage having the negative polarity have asymmetrical values to be applied to the pixel, for the effective voltages of not more than a first effective voltage which is lower than half of a maximum effective voltage; and shifting a counter electrode voltage or a source voltage by 0.3 V or more from a voltage causing the effective voltages in the positive polarity and the negative polarity to be symmetrically applied to the pixel.

According to the invention, the effective voltage having the positive polarity and the effective voltage having the negative polarity are controlled to have asymmetrical values to be applied to the pixel for the effective voltages of not more than the first effective voltage which is lower than half of the maximum effective voltage. Therefore, for example, voltages to be applied to the pixel for the black display in the normally black mode become higher than those conventionally applied. This causes the electric field to become strong in the cell thickness (vertical) direction. As a result, it is possible to prevent the movement of the impurities in lateral directions in the liquid crystal display panel, which leads the edge burning to be less likely to occur.

Further, to attain the object, a liquid crystal display apparatus of the present invention in which a voltage having a positive polarity and a voltage having a negative polarity are alternately applied to a pixel between a counter electrode and a pixel electrode, including: an effective voltage control section that controls effective voltages for an identical tone so that an effective voltage having the positive polarity and an effective voltage having the negative polarity are shifted by 0.3 V or more from each other and are asymmetrically applied to the pixel, for a tone at which a minimum effective voltage is applied to the pixel, and reduces asymmetricity more as a tone is changed from a tone for a lowest effective voltage to a tone corresponding to an effective voltage which is higher than the lowest effective voltage.

Further, to attain the object, a method for driving a liquid crystal display apparatus in which a voltage having a positive polarity and a voltage having a negative polarity are alternately applied to a pixel between a counter electrode and a pixel electrode, including the steps of: controlling effective voltages for an identical tone so that an effective voltage having the positive polarity and an effective voltage having the negative polarity are shifted by 0.3 V or more from each other and are asymmetrically applied to the pixel, for a tone at which a minimum effective voltage is applied to the pixel, and reducing asymmetricity more as a tone is changed from a tone for a lowest effective voltage to a tone corresponding to an effective voltage which is higher than the lowest effective voltage.

According to the invention, the effective voltage having the positive polarity and the effective voltage having the negative polarity are shifted by 0.3 V or more from each other and are asymmetrically applied to the pixel, for a tone at which the minimum effective voltages are applied to the pixel. Accordingly, voltages to be applied to the pixel for the black display in the normally black mode become higher than those conventionally applied. This causes the electric field to become strong in the cell thickness (vertical) direction. As a result, it is possible to prevent the movement of the impurities in lateral directions in the display panel, which leads the edge burning to be less likely to occur.

Further, in the present invention, the asymmetricity is gradually reduced as a tone is changed from the tone for the lowest effective voltage to the tone corresponding to an effective voltage which is higher than the lowest effective voltage. Therefore, it is possible that the relation between the tones and the effective voltages gets close to a conventional relation by reducing the asymmetricity when the effective voltages are higher than the lowest voltages.

Additional objectives, features, and strengths of the present invention will be made clear by the description below. Further, the advantages of the present invention will be evident from the following explanation in reference to the drawings.

BRIEF DESCRIPTION OF DRAWINGS

FIG. 1 (b) is a graph showing that asymmetricity of the effective voltages are within a range of all the tones which can be displayed.

FIG. 2 is a block diagram illustrating an overall structure of the liquid crystal display apparatus.

FIG. 3 is an equivalent circuit diagram illustrating a structure of a pixel of the liquid crystal display apparatus (omitting an auxiliary capacitor).

FIG. 7 (b) is a waveform chart showing the effective voltages shown in FIG. 7 (a) in which the shift amount is large for low voltages and a shift occurs for high voltages.

FIG. 8 (a) is a waveform chart showing that the effective voltages to be applied to the pixels have the largest asymmetrical values at the lowest tone and then the asymmetricity is gradually reduced.

FIG. 8 (b) is a waveform chart showing the effective voltages shown in FIG. 8 (a) in which the shift amount is large for low voltages and a shift occurs for high voltages.

FIG. 9 (b) a waveform chart showing the effective voltages shown in FIG. 9 (a) in which the shift amount is large for low voltages and the asymmetricity is gradually reduced as the effective voltages increase toward high voltages.

FIG. 10 (b) is a waveform chart of the effective voltages which is obtained by carrying out a parallel shift with respect to the waveform in FIG. 10 (a).

FIG. 13 (a) is a waveform chart showing that a counter electrode voltage is shifted alternately toward the positive polarity and the negative polarity when the effective voltages are asymmetrically applied to the pixel.

FIG. 13 (b) is a waveform chart showing that the counter electrode voltage has a larger shift amount than that of the counter electrode voltage shown in FIG. 13 (a) and is changed within a single polarity.

FIG. 14 (a) is a waveform chart showing that the source voltage is shifted alternately toward the positive polarity and the negative polarity when the effective voltages are asymmetrically applied to the pixel.

FIG. 14 (b) is a waveform chart showing that the source voltage has a larger shift amount than that of the source voltage shown in FIG. 14 (a) and is changed within a single polarity.

Figure 15:
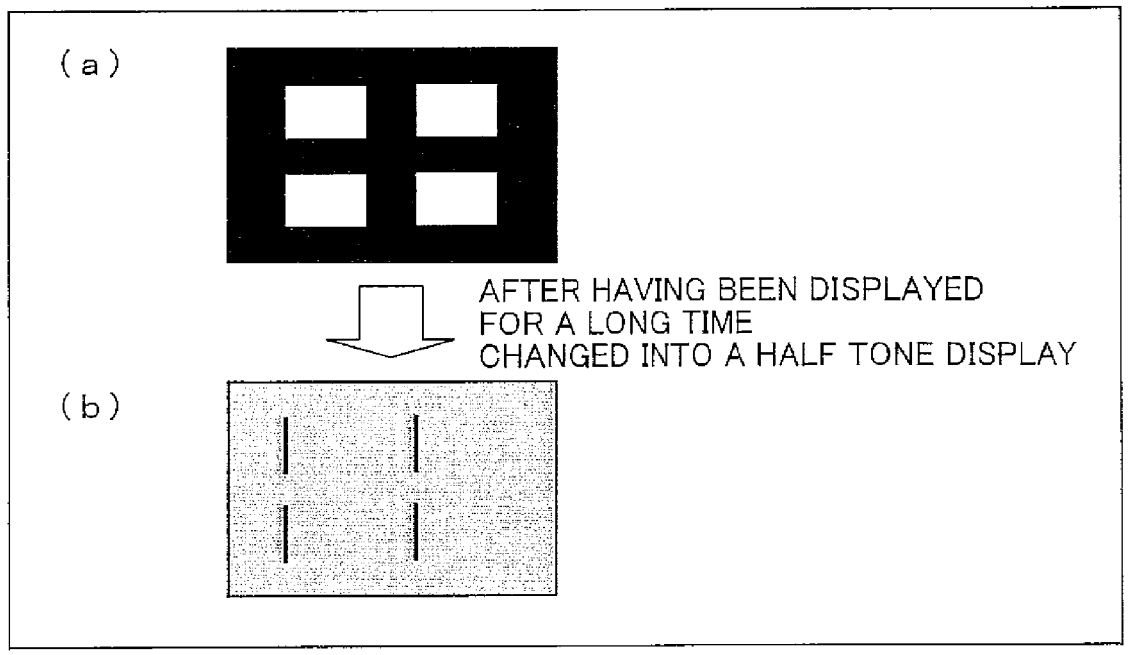

(a) of FIG. 15 is a plan view of a fixed pattern in which a black display includes white square displays; and (b) of FIG. 15 is a plan view of an edge burning, which would occur when a display of the fixed pattern, after having been displayed for a long time, is changed to a half tone display.

Figure 16:
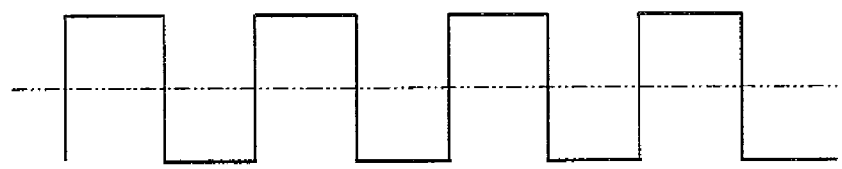

FIG. 16 is a waveform chart showing that conventional effective voltages are symmetrically applied to the pixel.

(a) of FIG. 17 is a plan view of a fixed pattern in which a black display includes white square displays when the counter electrode voltage is shifted from an optimum vale in a case where a vertical alignment control power is strong; and (b) FIG. 17 is a plan view of a plane burning which would occur when a display of the fixed pattern, after having been displayed for a long time, is changed to a half tone display.

(a) of FIG. 18 is a plan view of a fixed pattern in which a black display includes white square displays when the counter electrode voltage is shifted from an optimum value in a case where a vertical alignment control power is weak; and (b) of FIG. 18 is a plan view of a plane burning which would occur when a display of the fixed pattern, after having been displayed for a long time, is changed to a half tone display.

EXPLANATION OF REFERENCE NUMERALS 1 liquid crystal display panel
4 source signal generating section
4e ladder resistor
5 counter electrode voltage (Vcom) generating circuit
6 control section
7 pixel electrode substrate
8 counter substrate
12 pixel electrode
13 counter electrode
14 liquid crystal
P pixel
V1 first effective voltage
V2 second effective voltage
V3 third effective voltage
V4 forth effective voltage value
Vcom counter electrode voltage

BEST MODE FOR CARRYING OUT THE INVENTION

The following description deals with an embodiment of the present invention with reference to the drawings.

A liquid crystal display apparatus of the present invention includes a liquid crystal display panel 1, a scan line driving circuit 2, a signal line driving circuit 3, a source signal generating section 4, a counter electrode voltage (Vcom) generating circuit 5, and a control section 6 as illustrated in FIG. 2.

The liquid crystal display panel 1 includes a pixel electrode substrate 7, a counter substrate 8 so as to be provided parallel to and face the pixel electrode substrate 7, and a liquid crystal (not illustrated) filled in a space between the pixel electrode substrate 7 and the counter substrate 8. On the pixel electrode substrate 7, a plurality of scan lines G (0) . . . G (J) and a plurality of signal lines S (0) . . . S (I) are provided so as to intersect with one another and pixels P . . . are provided in matrix, respectively.

As illustrated in FIG. 3, a pixel P is provided in an area surrounded by adjacent scan lines G (j) and G (j−1) and adjacent signal lines S (i) and S (i+1). The pixel P includes a TFT (Thin Film Transistor) 11 serving as a switching element, and a liquid crystal capacitor $C_{LC}$. In the TFT 11, a gate is connected to the scan line G (j) and a source signal is supplied to the signal line S (i). The liquid crystal capacitor $C_{LC}$ includes a pixel electrode 12 connected to the TFT 11, a counter electrode 13 facing the pixel electrode 12, and a liquid crystal 14 sandwiched by the pixel electrode 12 and the counter electrode 13. The counter electrode 13 is provided on the counter substrate 8 so as to be shared by all of the pixels P.

In the pixel P, the pixel electrode 12 is connected to the signal line S (i) via a source and a drain of the TFT 11. The gate of the TFT 11 is connected to the scan line G (j). Also, the counter electrode 13 receives a counter electrode voltage Vcom released from the counter electrode voltage (Vcom) generating circuit 5. Since this causes a voltage difference between a signal voltage of a source signal Vs supplied from the signal line S (i) and a counter electrode voltage Vcom to be applied to the liquid crystal capacitor $C_{LC}$ while the TFT 11 is turned ON, a transmittance or a reflection rate of the liquid crystal is modulated. This allows the pixels P . . . to display an image corresponding to an inputted image data. Also, electric charge accumulated by the liquid crystal capacitor $C_{LC}$ is retained in each of the pixels P for a certain period of time. This allows a display of an image to be maintained in accordance with the electric charge even after the TFT is turned OFF.

The following description deals with an example of changing the counter electrode voltage and the source voltage.

Normally, a source voltage is fixed in accordance with a certain tone. For example, in FIG. 6, a high voltage for tone 0 is set to 8.5 V and a low voltage for tone 0 is set to 7.5 V. Also, a counter electrode voltage is fixed to 7.5 V by taking into consideration a lead-in voltage due to voltage fluctuation in gate electrode e.g. 0.5 V. With this arrangement, the effective voltages to be applied to the pixel, which are affected by the voltage fluctuation in the gate electrode, are 8.0 V for the high voltage side and 7.0 V for the low voltage side. As a result, +0.5 V and −0.5 V higher and lower than the counter electrode voltage are applied to a pixel as the effective voltages.

In an embodiment in accordance with the present invention, it is intended to further alleviate a plane burning by shifting the counter electrode voltage from an optimum value by a shift amount, for example, of 1 V, which shift amount is changed between +1 V and −1 V alternately. This is also applicable to the source voltage. The plane burning refers to a phenomenon in which, in a case where a state illustrated in FIG. 15 (a) is displayed for a long time, and is then changed into a half tone display, in a normally black mode, for example, a black display is retained brightly in an original area of the black display.

In the case of the normally black mode where a vertical alignment control power such as a photo-alignment is weak, a plane burning (brightness) caused by tilt of liquid crystal molecules may be cancelled out by the plane burning (brightness) caused by shifting the counter electrode voltage from the optimum value. In this case, it is not required to change the shift amount. Specifically, as illustrated in FIG. 17 (a) and FIG. 17 (b), normally, in a case where the vertical alignment control power is strong in the normally black mode, the black display is retained brightly and sharply while the display is changed into a half tone display, when the counter electrode voltage is shifted from the optimum voltage. However, in a case where the vertical alignment control power is weak in the normally black mode, the black display becomes blur when it is changed into a half tone display. This is because (i) a white display part becomes bright due to the fact that liquid crystal molecules remain tilted in the white display part and (ii) a black display part becomes bright due to the burning in the black display part caused by a counter electrode voltage. Therefore, it is possible to prevent a plane burning only by shifting the counter electrode voltage from the optimum value in a case where the vertical alignment control power is weak in the normally black mode (see FIG. 18 (a) and FIG. 18 (b)).

For a specific changing cycle, a control section 6 includes a counter for counting and determining that the time corresponding to an n-frame has elapsed. When the counter determines that the time corresponding to an n-frame has elapsed, a predetermined source voltage or counter electrode voltage is changed. Instead of the counter, it may be possible to change a counter electrode voltage in sync with a rising edge of a power source.

In the liquid crystal display apparatus, for example, as shown in a conventional explanatory drawing in FIG. 15, the voltage having the positive polarity and the voltage having the negative polarity, which have an identical effective voltage for an identical tone value, are applied to the pixel between the counter electrode and the pixel electrode, and so become symmetric with respect to the counter electrode voltage. Note however that a low voltage having the positive polarity and a low voltage having the negative polarity are applied to a pixel for a black display. This causes an occurrence of the edge burning when a fixed pattern, after having been displayed for a long time, is changed into a half tone display. In this case, when a pixel has the lowest luminance, i.e., when the pixel has a zero tone, voltages of, for example, ±0.5 V are applied to the pixel.

The studies about the problem allows a presumption that this phenomenon is caused because impurities inside a liquid crystal display panel 1 move in a certain direction in a black display, and is accumulated at a boundary between the black display and a white display. Namely, when voltages to be applied to the pixel P are low, the impurities become easy to move in lateral directions because the electrical field in a cell thickness (vertical) direction is weak. This appears to cause the edge burning at the boundary, between the black display and the white display, which has a strong electrical filed. Therefore, it appears that the edge burning is less likely to occur by increasing the voltages to be applied to the pixel P because the electrical filed in the cell thickness direction becomes strong and the impurities are less likely to move in lateral directions.

Figure 1:
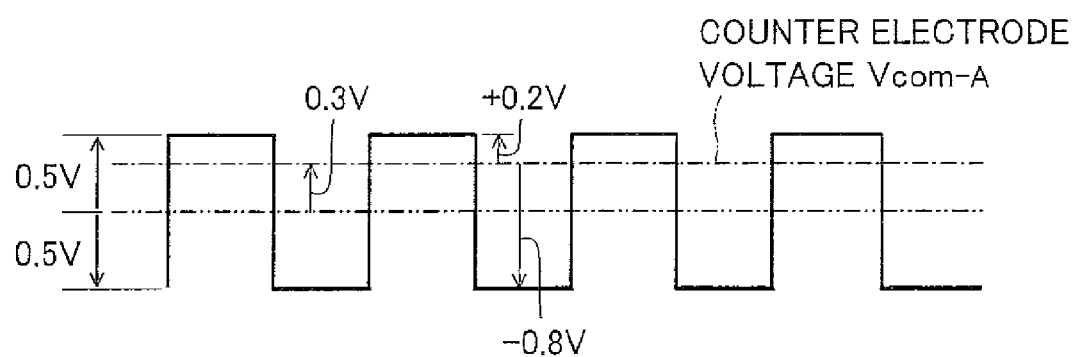
FIG. 1 (*a*) is a waveform chart of effective voltages for an identical tone are controlled so that the effective voltage having the positive polarity and the effective voltage having the negative polarity are asymmetrically applied to a pixel between a counter electrode and a pixel electrode in an embodiment of the liquid crystal display apparatus in accordance with the present invention.
Figure 1:
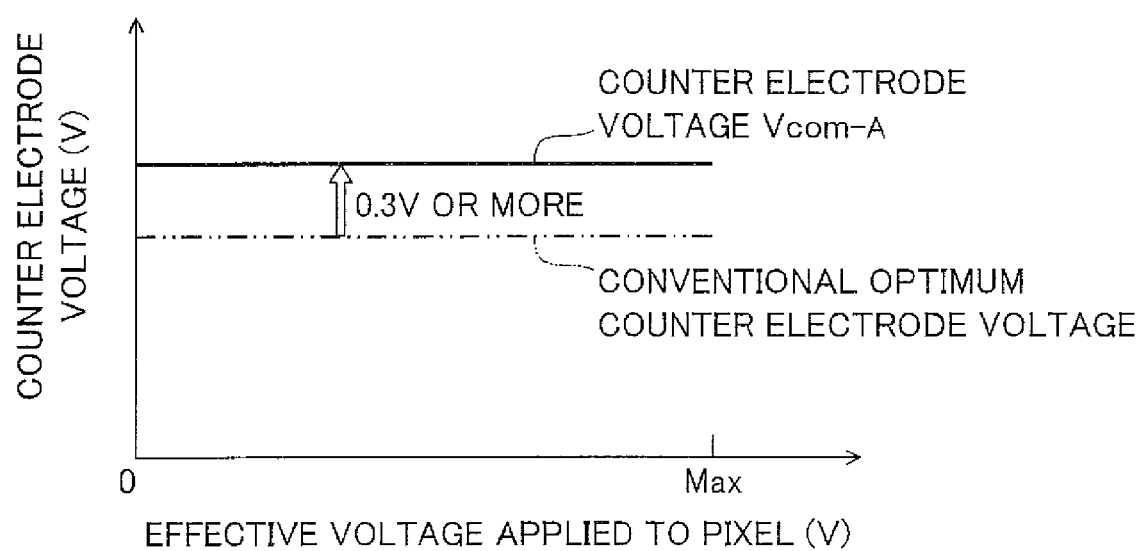

In view of this, an embodiment of the present invention, as illustrated in FIG. 1 (a), is arranged so that an effective voltage having the positive polarity and an effective voltage having the negative polarity, for an identical tone value, are asymmetrically applied to a pixel P between a counter electrode 13 and a pixel electrode 12. Specifically, according to the present embodiment, a counter electrode voltage Vcom-A is shifted by 0.3 V so as to have higher positive polarity than a conventional counter electrode voltage. This causes the voltage having the negative polarity to have a voltage of −0.8 V. As a result, the edge burning is less likely to emerge because the electric field in the cell thickness direction becomes strong due to the increase in voltage to be applied to the pixel P.

Figure 4:
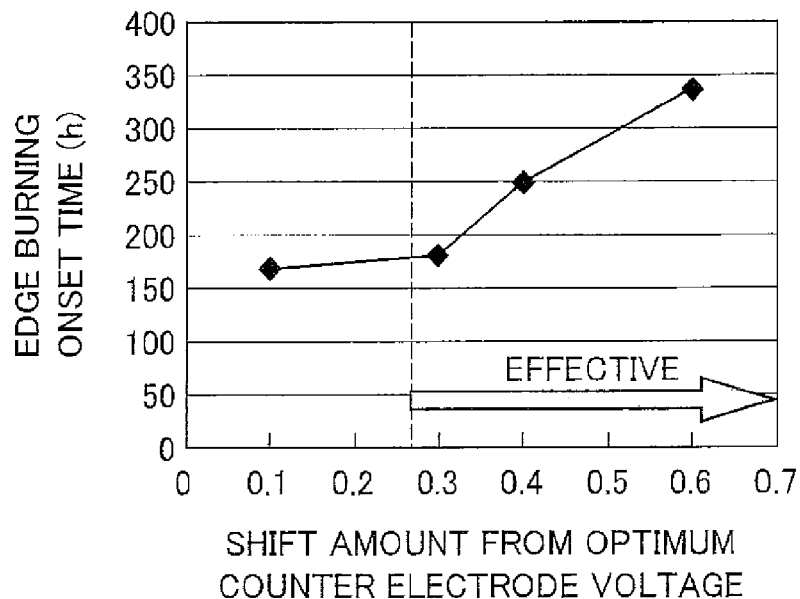
FIG. 4 is a graph showing a relation between an onset time of an edge burning and a shift amount from an optimum counter electrode voltage.

The following description deals with grounds of the shift amount of 0.3 V with reference to FIG. 4. FIG. 4 shows a relation between (i) an onset time of the edge burning in tone 0, i.e., at the lowest voltage and (ii) a shift amount from the optimum value of the counter electrode voltage. The onset time of the edge burning means how long it would take to recognize the edge burning visually. As is clear from FIG. 4, the onset time of the edge burning is getting longer for the shift amount of 0.3 V or more. Namely, it is clear that the shift amount of 0.3 V or more has an effect on alleviation of the edge burning. Therefore, to prevent the edge burning, it is necessary to shift the counter electrode voltage by 0.3 V or more from the optimum value of the counter electrode voltage Vcom, in a case of the lowest luminance, i.e., ±0.5 V in the present embodiment. Namely, it is necessary to apply an effective voltage of 0.8 V or more to the pixel P in a case of tone 0, i.e., at the lowest voltage.

However, as explained above, in a conventional arrangement, the voltage having the positive polarity and the voltage having the negative polarity, which have symmetric effective voltages with respect to the counter electrode voltage, are applied to a pixel. Therefore, in a case of a low tone in which the edge burning occurs outstandingly, especially in a case where asymmetric effective voltages of less than ±0.8 V are applied to a pixel, it is impossible to secure symmetric effective voltages of 0.8 V for the positive and negative polarities. Note that for tones in which effective voltages of not less than ±0.8 V are applied to a pixel, it is possible to apply to the pixel the effective voltages of 0.8 V or more which are symmetric in the positive and negative polarities. Accordingly, the edge burning is immaterial and presents no problem. However, in an arrangement in which the voltages of 0.8 V or more having the positive and negative polarities are applied to a pixel, decline in contrast becomes large, which is not preferable. Therefore, in view of preventing decline in contrast, it is preferable that either the voltage having the positive polarity or the voltage having the negative polarity is 0.8 V or more.

In a case of low tones in which the edge burning occurs, it is useful that a counter electrode voltage or a source voltage is shifted from the optimum value of the counter electrode voltage Vcom so that the effective voltages of 0.8 V or more are applied to a pixel. Specifically, it is possible to apply, even in low tones other than tone 0, to a pixel either a voltage having the negative polarity or a voltage having the positive polarity each of which has an effective voltage of 0.8 V or more, by shifting 0.3 V at least in the lowest luminance (tone 0). Therefore, it is possible to prevent the edge burning conventionally occur.

As explained above, in the present embodiment, the shift amount from the optimum value of the counter electrode voltage Vcom is set to 0.3 V. A shift direction is not limited to either in the positive or negative polarity to attain the object. Note that FIG. 1 and FIG. 7 through FIG. 11 (later described) deals with a case where the optimum counter electrode is shifted toward the positive polarity.

Also, it is preferable that the shift amount from the optimum value of the counter electrode voltage Vcom is 2.0 V or less. A shift amount of more than 2.0 V causes a reduction in contrast and an increase in flicker.

In the present embodiment, as illustrated in FIG. 1 (b), the counter electrode voltage Vcom is shifted by 0.3 V toward the positive polarity from a voltage (an optimum counter electrode voltage Vcom) causing the effective voltage having the positive polarity and the effective voltage having the negative polarity to be symmetrically applied to the pixel P. In other words, the counter electrode voltage Vcom is shifted by 0.3 V or more toward the positive polarity from the voltage causing the effective voltage having the positive polarity and the effective voltage having the negative polarity to be symmetrically applied to the pixel P so that the effective voltage having the negative polarity is higher than the effective voltage having the positive polarity, for an identical tone to be applied to the pixel P.

Figure 5:
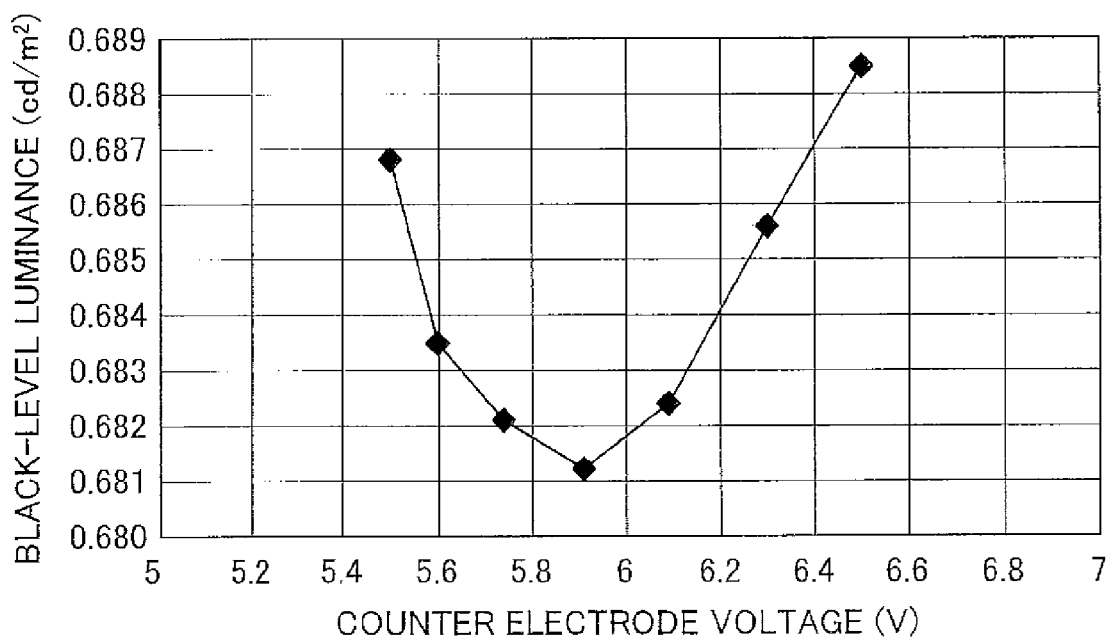
FIG. 5 is a graph showing a relation between a transition of black-level luminance and a counter electrode voltage.

The following description deals with how to calculate the optimum voltage of the counter electrode 13. For example, in bright tones, it is possible to find the optimum voltage of the counter electrode 13 by displaying a flicker pattern. Note that the voltage minimizing the flicker is the optimum voltage. In a case of black display, i.e., tone 0 in the normally black mode, however, no flicker is correctly observed even though the counter electrode 13 is shifted from the optimum voltage. In this case, for example as illustrated in FIG. 5, an optimum voltage of the counter electrode 13 is found based on transition of black-level luminance. According to an example in FIG. 5, the black-level luminance has the lowest voltage of 5.9 V. Therefore, the optimum voltage of the counter electrode 13 is 5.9 V in case of a current source voltage for tone 0. Note that when the source voltage Vs for tone 0 is shifted, the optimum voltage of the counter electrode 13 is also shifted.

Figure 6:
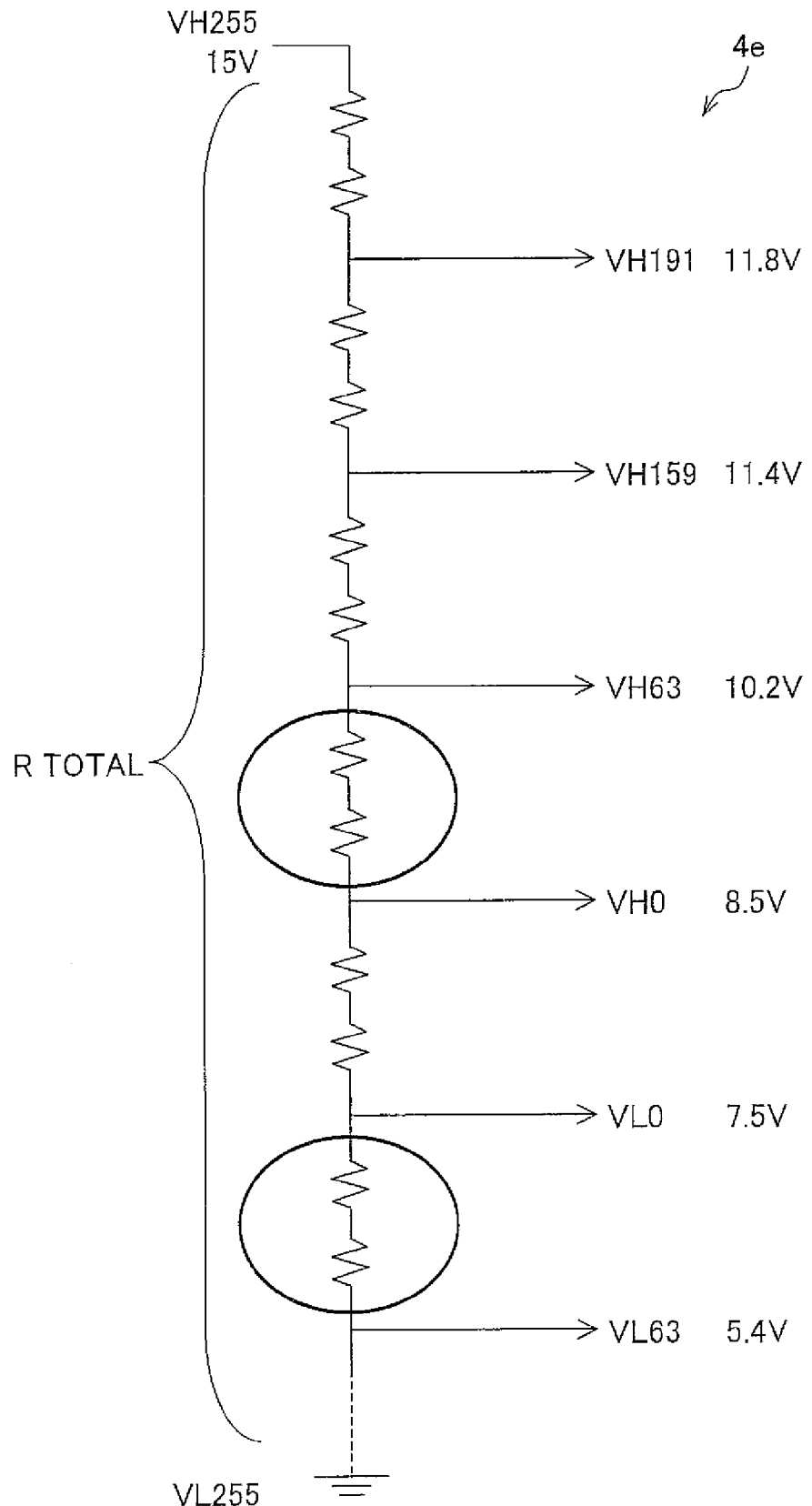
FIG. 6 is a circuit diagram of a ladder resistor for controlling the effective voltages to be applied to the pixel between the counter electrode and the pixel electrode for an identical tone to be asymmetrical in the positive and negative polarities.

The following description deals with how to shift the effective voltage by 0.3 V toward the positive polarity from the counter electrode voltage causing the effective voltage having the positive polarity and the effective voltage having the negative polarity to be symmetrically applied to the pixel P, with reference to FIG. 6. FIG. 6 illustrates ladder resistor 4e in the source signal generating section 4.

In the ladder resistor 4e, VH 0 through VH 255 are applied voltages for the positive polarity and VL 0 through VL 255 are applied voltages for the negative polarity. The present embodiment is arranged so that asymmetric voltages are applied to the pixel P only for low voltages, by adjusting resistances of the resistors for the applied voltage VH 0 through VH 63 and VL 0 through VL 63 (circled resistances in FIG. 6) without changing the total resistance of R total. Namely, in this example, an asymmetric source voltage is supplied by the ladder resistor 4e in the source signal generating section 4 serving as the effective voltage control section. Note that the applying of asymmetric voltage is not limited to this. The counter electrode voltage Vcom can be set to, for example, 7.5 V independently by switching and/or sliding with the use of changing-over switches in the counter electrode voltage (Vcom) generating circuit 5 serving as the effective voltage control section.

In the present embodiment, a tone falls within a range from 0 to 255. However, the present invention is not limited to this tone range.

Further, in the above explanation, as illustrated in FIG. 1 (b), the counter electrode voltage Vcom-A is shifted by 0.3 V toward the positive polarity from the counter electrode voltage causing the effective voltage having the positive polarity and the effective voltage having the negative polarity to be symmetrically applied to the pixel P for all the tones.

With the arrangement, for example, voltages to be applied to the pixel P during the black display in the normally black mode become higher than those conventionally applied. This causes the electric field to become strong in the cell thickness (vertical) direction. As a result, it is possible to prevent the movement of the impurities in the liquid crystal display panel 1 in lateral directions, which leads the edge burning to be less likely to occur. In the normally white mode, voltages to be applied to the pixel during the white display become higher than those conventionally applied. Therefore, the edge burning is less likely to occur, like the case of the normally black mode. As explained above, according to the present embodiment, it is possible to prevent the edge burning both in the normally black mode and in the normally white mode. For convenience of explanation, the following description deals with cases mainly in the normally black mode.

Also, a shift amount which was less likely to cause the edge burning is 0.3 V or more according to experiments. Therefore, in the present embodiment, the edge burning surly becomes less likely to occur by shifting either the counter electrode voltage Vcom or the source voltage Vs by 0.3 V or more from a voltage causing the effective voltage having the positive polarity and the effective voltage having the negative polarity to be symmetrically applied to the pixel P.

Figure 7:
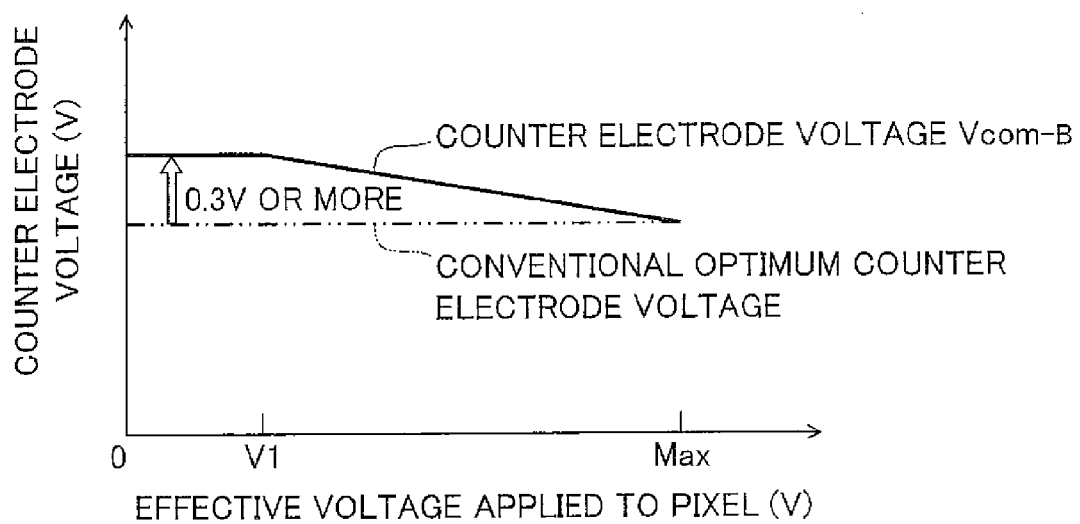
FIG. 7 (a) is a waveform chart showing that the effective voltages to be applied to the pixel are asymmetrical in the positive and negative polarities up to the first effective voltages and then the asymmetricity is gradually reduced.
Figure 7:
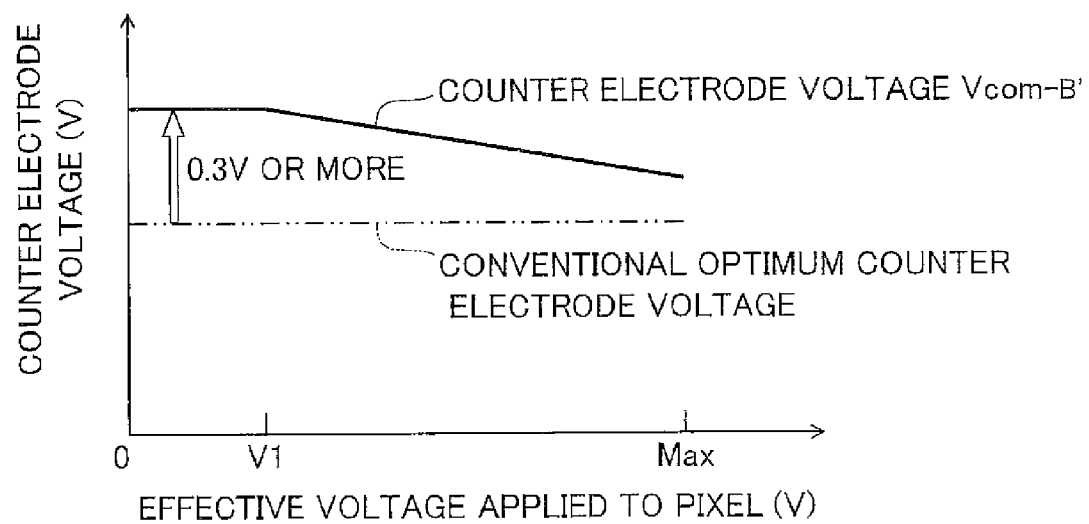

The present invention is not limited to this. For example, as illustrated in FIG. 7 (a), even for a first effective voltage V1 which is lower than half of the maximum effective voltage, more specifically, for voltages of more than ±0.8 V, it is possible to control asymmetric effective voltages, for an identical tone, which have the positive polarity and the negative polarity, respectively, and which are applied to a pixel P between the counter electrodes 12 and the pixel electrodes 13. It is also possible to adjust a source voltage for each tone so that asymmetricity is reduced for voltages of higher than the first effective voltage V1. Namely, the counter electrode voltage Vcom is set to the same voltage as that conventionally set. However, since the source voltage is adjusted, it is possible to have an optimum counter electrode voltage Vcom-B which is changed as illustrated in FIG. 7 (a). In FIG. 7 (a), an axis of ordinate shows the optimum counter electrode voltage, i.e., a counter electrode voltage causing the flicker to be minimum, or the luminance to have a minimum or maximum value.

Namely, the edge burning occurs for low effective voltages. Therefore, when the asymmetricity is reduced for the effective voltages which are higher than the first effective voltage V1, it is possible that the relation between the effective voltages and the tones gets close to a conventional relation in which an effective voltage having the positive polarity and an effective voltage having the negative polarity are symmetric.

In this case, as illustrated in FIG. 7 (b), it may be possible to have another optimum counter electrode voltage Vcom-B' in which the shift amount is large for low voltages and a shift occurs for high voltages.

Further, a liquid crystal display apparatus of the present embodiment, for example, as illustrated in FIG. 8 (a), effective voltages for an identical tone to be applied to the pixels P between the counter electrodes 13 and the pixel electrodes 12 may be controlled so that an effective voltage having the positive polarity and an effective voltage having the negative polarity are shifted by 0.3 V or more from each other and are asymmetrically applied to the pixel, for a tone at which a minimum effective voltage is applied pixel and the asymmetricity may be reduced more as a tone is changed from a tone for a lowest effective voltage to a tone corresponding to an effective voltage which is higher than the lowest effective voltage. Namely, the counter electrode voltage Vcom is set to the same voltage as that conventionally set. However, since the source voltage is adjusted, it is possible to have an optimum counter electrode voltage Vcom-C which is changed as illustrated in FIG. 8 (a). In the FIG. 8 (a), an axis of ordinate shows the optimum counter electrode voltage, i.e., a counter electrode voltage causing the flicker to be minimum, or the luminance to have a minimum or maximum value.

In this case, as illustrated in FIG. 8 (b), it may be possible to have another optimum counter electrode voltage Vcom-C' in which the shift amount is large for low voltages and a shift occurs for high voltages.

This arrangement may be realized by adjusting a certain source voltage. Specifically, the arrangement is realized by a source voltage, for example, which is capable of controlling and adjusting a plurality of tone voltages.

With this arrangement, for example, voltages to be applied to the pixel P for the black display in the normally black mode are asymmetric so that a voltage become higher than that conventionally applied in one side of the polarities. This causes the electric field to become strong in the cell thickness (vertical) direction. As a result, it is possible to prevent the movement of the impurities in the display panel in lateral directions, which leads the edge burning to be less likely to occur.

In the arrangements, the asymmetricity is reduced as the tone is changed from a tone for the lowest effective voltages to a tone for voltages which are higher than the lower lowest effective voltages. This allows the relation between the effective voltage and the tones to get close to a conventional relation in which an effective voltage having the positive polarity and an effective voltage having the negative polarity are symmetric.

Figure 9:
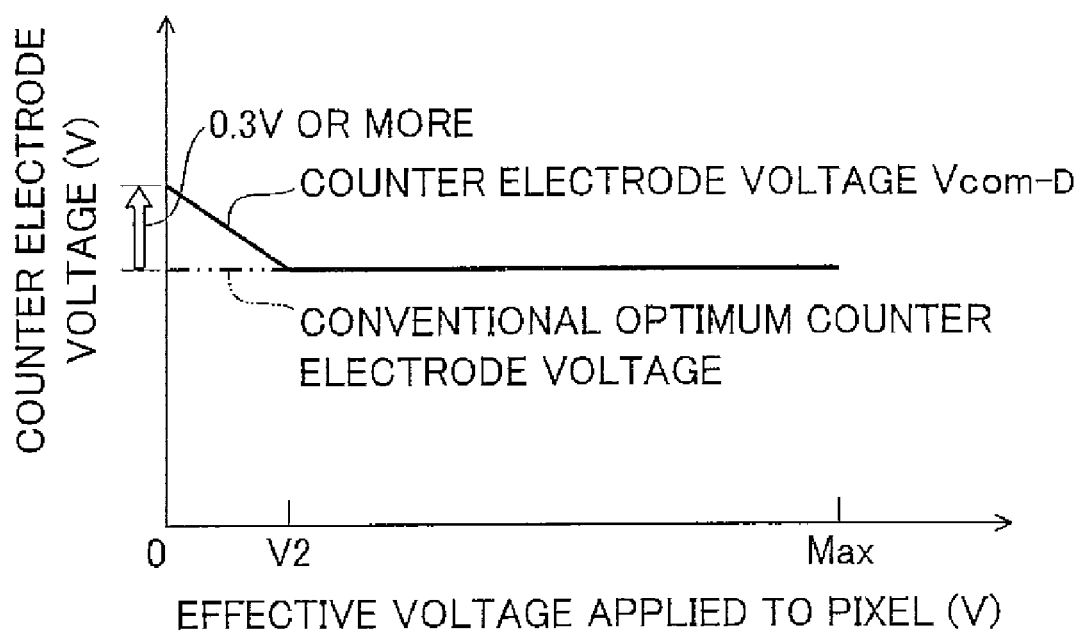
FIG. 9 (a) is a waveform chart showing that the effective voltages to be applied to the pixel have the largest asymmetric vales for the lowest tone and the asymmetricity is gradually reduced up to a second effective voltage.
Figure 9:
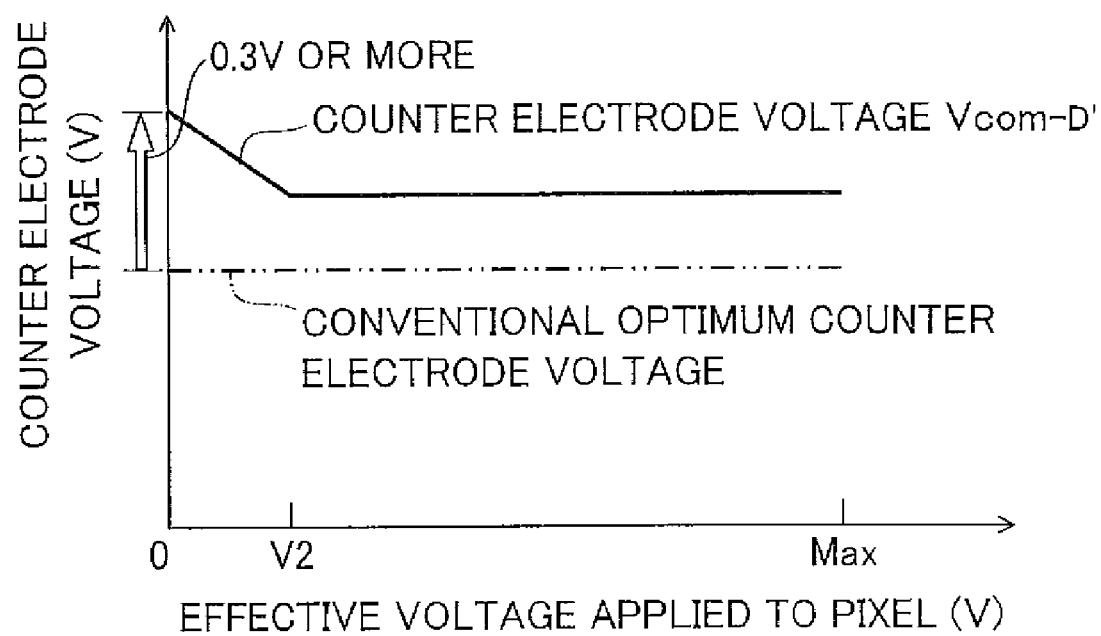

Further, a liquid crystal of the present embodiment, for example as illustrated in FIG. 9 (a), it is possible to adjust a source voltage for each of the tones so that the asymmetricity is reduced as the effective voltage is changed from the lowest effective voltage to a second effective voltage V2, i.e. ±0.8 V, which is higher than the lowest effective voltage. Namely, the counter electrode voltage Vcom is set to the same voltage as that conventionally set. However, since the source voltage is adjusted, it is possible to have an optimum counter electrode voltage Vcom-D which is changed as illustrated in FIG. 9 (a). In the FIG. 9 (a), an axis of ordinate shows the optimum counter electrode voltage, i.e., a counter electrode voltage causing the flicker to be minimum, or the luminance to have a minimum or maximum value.

In this case, as illustrated in FIG. 9 (b), it may be possible to have another optimum counter electrode voltage Vcom-D' in which the shift amount is large for low voltages and a shift occurs for high voltages.

With the arrangement, the asymmetricity is gradually reduced up to the second effective voltage V2 which is higher than the lowest effective voltage. Therefore, it is possible to prevent the movement of the impurities in the liquid crystal panel 1 in lateral directions up to the second effective voltage V2 which causes the asymmetricity to be maintained, thereby preventing the edge burning.

Figure 10:
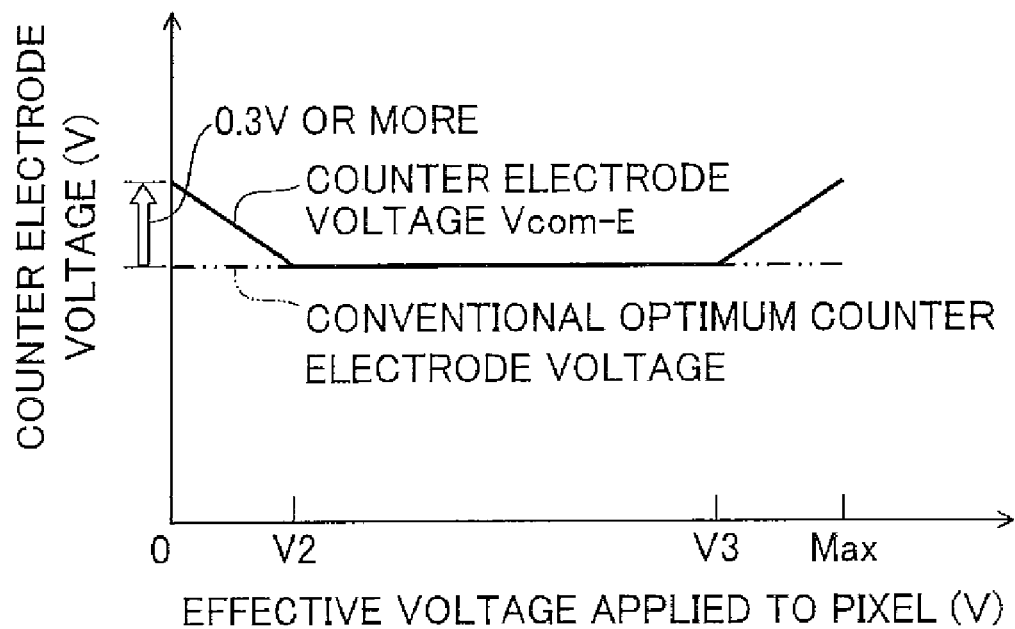
FIG. 10 (a) is a waveform chart showing that the effective voltages to be applied to the pixel are asymmetrical both for low voltages and high voltages.
Figure 10:
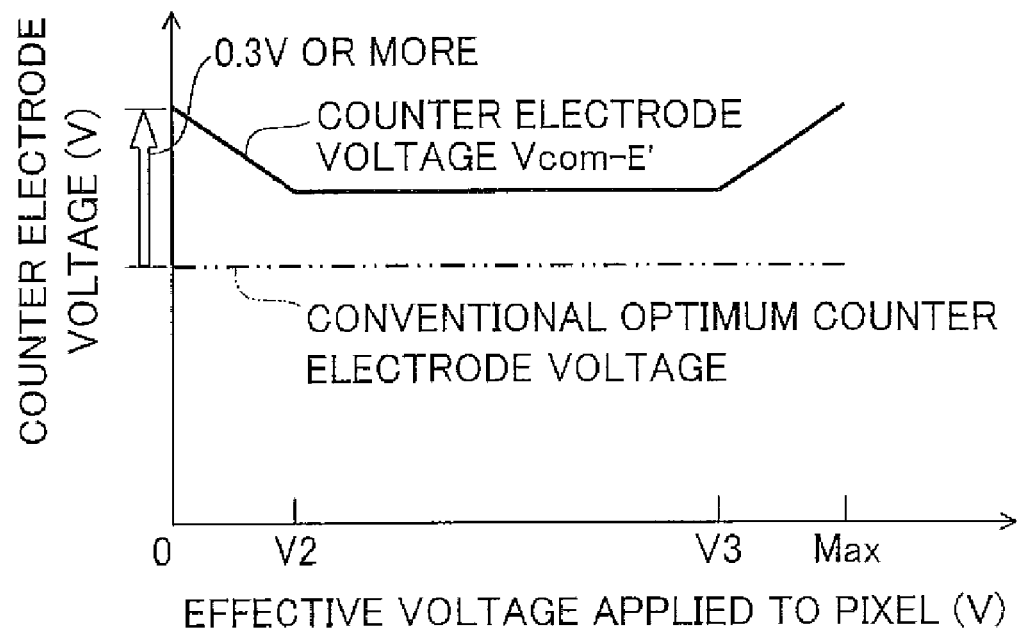

Further, according to another liquid crystal display apparatus of the present embodiment, for example as illustrated in FIG. 10 (a), it is possible that the asymmetricity of an effective voltage having the positive polarity and an effective voltage having the negative polarity which are applied to the pixel becomes greater as the effective voltage gets closer to the maximum effective voltage from a third effective voltage V3 which is higher than the second effective voltage V2 and is also higher than half of the maximum effective voltage. Namely, the counter electrode voltage Vcom is set to the same voltage as that conventionally set. However, since the source voltage is adjusted, it is possible to have an optimum counter electrode Vcom-E which is changed as illustrated in FIG. 10 (a). In the FIG. 10 (a), an axis of ordinate shows the optimum counter electrode voltage i.e, a counter electrode voltage causing the flicker to be minimum, or the luminance to have a minimum or maximum value.

In this case, as illustrated in FIG. 10 (b), it may also be possible to have another optimum counter electrode voltage Vcom-E' which is obtained by carrying out a parallel shift with respect to the waveform in FIG. 10 (a).

This allows preventing the plane burning for low voltages of not higher than the second effective voltage V2, and for high voltages of higher than the third effective voltages V3, for both of which voltages the flicker is hard to recognize.

Figure 11:
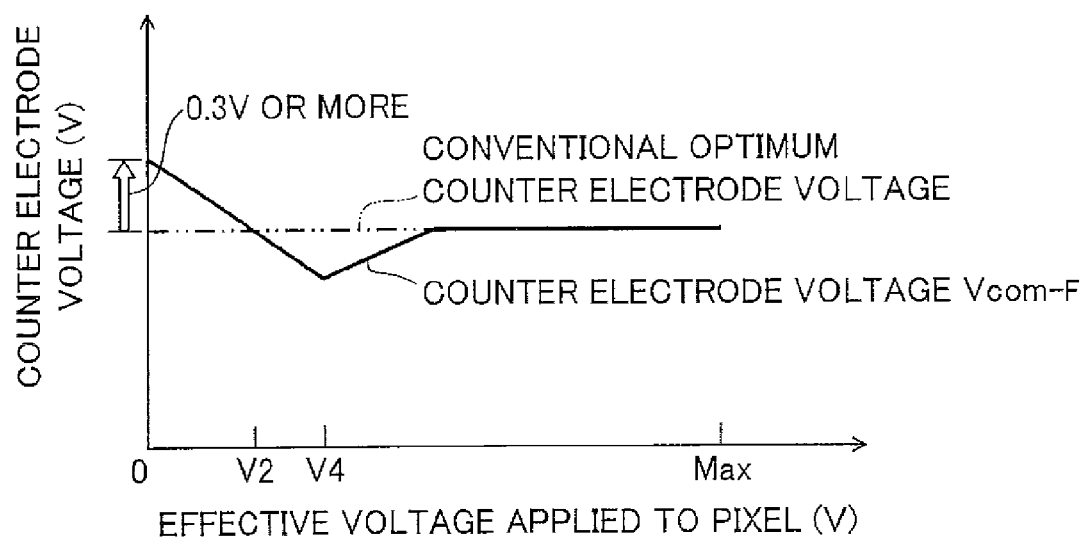
FIG. 11 is a waveform chart showing that the effective voltages to be applied to the pixel (i) have the largest asymmetricity for the lowest tone; (ii) the asymmetricity is reduced toward the second effective voltage; (iii) an axis of asymmetry is shifted toward the opposite polarity for a forth effective voltage; (iv) and then the asymmetricity is reduced toward high voltages.

Also, in a further liquid crystal display apparatus of the present embodiment, for example as illustrated in FIG. 11, an effective voltage having the positive polarity and an effective voltage having the negative polarity are asymmetrically applied to the pixel P while an axis of symmetry is shifted toward the opposite polarity for a fourth effective voltage V4 which is higher than the second effective voltage V2. According to the liquid crystal display apparatus, it is possible to reduce the asymmetricity for voltages of higher than the fourth effective voltage V4.

With the arrangement, when the effective voltage having the positive polarity and the effective voltage having the negative polarity are asymmetrical, an axis of asymmetry is once shifted toward the opposite polarity. This allows the flicker to be prevented more surely, as compared to a case where the axis of asymmetry is in the same polarity without being shifted.

Also, according to the liquid crystal display apparatus of the present embodiment, for example as illustrated in FIG. 1 (a) and FIG. 1 (b), it is preferable that the effective voltage having the positive polarity and the effective voltage having the negative polarity, whose white display luminance is not more than 5% or whose transmittance is not more than 5%, are asymmetrically applied to the pixel P in the normally black mode, whereas the effective voltage having the positive polarity and the effective voltage having the negative polarity, whose white display luminance is not less than about 95% or whose transmittance is not less than about 95%, are asymmetrically applied to the pixel P in the normally white mode.

Namely, the effective voltage having the positive polarity and the effective voltage having the negative polarity, whose white display luminance is not more than about 5% or whose transmittance is not more than about 5%, are asymmetrically applied to the pixel P in the normally black mode, whereas the effective voltage having the positive polarity and the effective voltage having the negative polarity, whose white display luminance is not less than about 95% or whose transmittance is not less than about 95%, are asymmetrically applied to the pixel P in the normally white mode.

Namely, in the above ranges, the effective voltages to be applied to the pixel P are low. Therefore, it is possible to provide a liquid crystal display apparatus which can prevent the edge burning which would occur when a display of a fixed pattern, after having been displayed for a long time, is changed to a half tone display.

In the normally black mode, the range that the white display luminance or the transmittance is not more than about 5% is defined because the flicker is hard to recognize. It is more preferable that the white display luminance or the transmittance is not more than 2%.

On the other hand, in the normally white mode, the range that white display luminance or the transmittance is not less than about 95% is defined because the flicker is hard to recognize. It is more preferable that the white display luminance or the transmittance is not less than about 98%.

Figure 12:
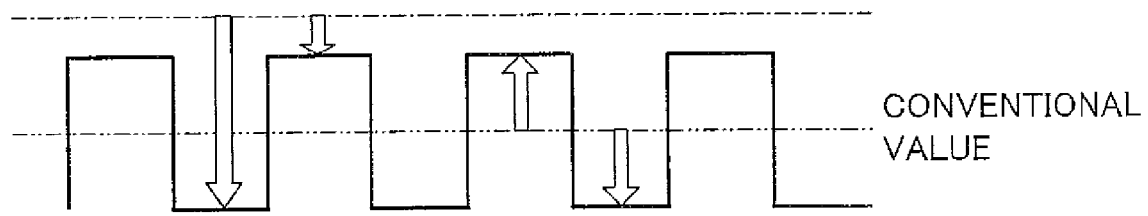
FIG. 12 is a waveform chart showing that the effective voltages are controlled by a single polarity when the effective voltages are asymmetrically applied to the pixel.

Further, in a liquid crystal display apparatus of the present embodiment, as illustrated in FIG. 12, the counter electrode voltage (Vcom) generating circuit 5 may control the effective voltages by a single polarity driving instead of a polarity inversion driving when the effective voltages of not less than 0.3 V to be applied to the pixels P are asymmetrical.

Namely, the applied voltage may have a single polarity when the counter electrode voltage Vcom is largely shifted.

Also, a liquid crystal display apparatus of the present embodiment, as illustrated in FIG. 13 (a) and FIG. 13 (b), the counter electrode voltage (Vcom) generating circuit 5 may shift, for every plural frames or for every plural fields, counter electrode voltages Vcom-G and Vcom-G' by 0.3 V or more alternately toward the positive polarity and the negative polarity from an effective voltage causing the voltage having the positive polarity and the voltage having the negative polarity to be asymmetrically applied to the pixel, in a certain pixel voltage range or all the pixel voltage ranges.

In general, when the counter electrode voltage is shifted toward a single polarity for a long time, the plane burning worsens. In this regard, with the arrangement, the polarities toward which the counter electrode voltage is shifted are alternately changed at a certain interval. This allows preventing of the plane burning.

Further, according to a liquid crystal display apparatus of the present embodiment, as illustrated in FIG. 13 (a) and 13 (b), when driving counter electrode voltages Vcom-G and Vcom-G' so that an effective voltage having the positive polarity and an effective voltage having the negative polarity are asymmetrically applied to a pixel, a counter electrode voltage (Vcom) generating circuit 5 may cause each of the counter electrode voltages Vcom-G and Vcom-G' to change to alternately have a shift toward the positive polarity and a shift toward the negative polarity at a certain interval.

With this arrangement, it is possible to carry out the changing of the polarities with a simple circuit because a shift toward the positive polarity and a shift toward the negative polarity are changed alternately at a certain interval.

In the above example, the counter electrode voltage Vcom is changed so as to alternately have a shift toward the positive polarity and a shift toward the negative polarity. The present embodiment is, however, not limited to this. For example as illustrated in FIG. 14 (a) and FIG. 14 (b), when driving a source voltage Vs so that a voltage having the positive polarity and a voltage having the negative polarity become asymmetrical, the source signal generating section 4 may cause the source voltage Vs to change to alternately have a shift toward the positive polarity and a shift toward the negative polarity at a certain interval.

Further, in the liquid crystal display apparatus of the present embodiment, for example as illustrated in FIG. 13 (a), FIG. 13 (b), FIG. 14 (a), and FIG. 14 (b), when driving the counter electrode voltages Vcom-G and Vcom-G' so that the effective voltage having the positive polarity and the effective voltage having the negative polarity, which are applied to a pixel, become asymmetrical, the counter electrode voltage (Vcom) generating circuit 5 may cause each of the counter electrode voltages Vcom-G and Vcom-G' to change in sync with turning on the liquid crystal display panel so as to alternately or randomly have a shift toward the positive polarity and a shift toward the negative polarity.

With this arrangement, it is possible to carry out the changing of the polarities with a simple circuit because a shift toward the positive polarity and a shift toward the negative polarity are changed alternately or randomly in sync with turning on the liquid crystal display panel 1. Also, it appears to be appropriate to carry out the changing of the polarities in sync with turning on the liquid crystal display panel.

Further, in the liquid crystal display apparatus of the present embodiment, it is preferable the counter electrode voltage (Vcom) generating circuit 5 changes the polarities of the counter electrode voltages Vcom alternately toward the positive polarity and the negative polarity, after the display is changed to the entire black display, entire white display, or entire gray display.

Namely, when the changing of polarities is carried out during a normal display including a moving image display, a concern of display malfunction exists. Therefore, it is preferable to carry out the changing of polarities while displaying an entire black display, an entire white display, or an entire gray display which includes a single color display of red (R), green (G), and blue (B), or a still image display.

Further, in a liquid crystal display apparatus of the present embodiment, the counter electrode voltage (Vcom) generating circuit 5 may change the polarities of the counter electrode voltage Vcom at an interval of about one hour to ten days, so that the effective voltage having the positive polarity and the effective voltage having the negative polarity are asymmetrically applied.

Note that a short-term interval of the changing of polarities causes a reduction in effect of preventing the edge burning. However, a long-term interval of the changing of polarities may cause an increase in plane burning.

Therefore, it is preferable that a shift toward the positive polarity and a shift toward the negative polarity are changed alternately in an interval of about one hour to about ten days.

In the liquid crystal display apparatus of the present embodiment, it is preferable that the counter electrode voltage (Vcom) generating circuit 5 or the source signal generating circuit 4 applies a voltage to the liquid crystal 14 in the pixel P between a pair of substrates, i.e., the pixel electrode substrate 7 and the counter substrate 8 in a liquid crystal panel 1.

This allows providing a general liquid crystal display apparatus including a liquid crystal panel 1 having a pixel electrode substrate 7 and a counter substrate 8 with a feature that can prevent the edge burning which would occur when a display of a fixed pattern, after having been displayed for a long time, is changed into a half tone display.

As explained above, in the liquid crystal display apparatus of the present invention, the effective voltage control section shifts the counter electrode voltage by 0.3 V or more toward the positive polarity from a voltage causing the effective voltage having the positive polarity and the effective voltage having the negative polarity, for an identical tone, to be symmetrically applied to the pixel so that the effective voltage having the negative polarity is higher than the effective voltage having the positive polarity to be applied to the pixel.

Experiments revealed that it is more effective against the burning that the counter electrode voltage is set to cause the effective voltage having the negative polarity to be higher than the effective voltage having the positive polarity to be applied to the pixel for an identical tone. The reason would appear to be as follows. There are many plus ions such as positively charged impurities in the panel and these plus ions are easy to be fixed to the TFT substrate.

Therefore, the edge burning surly becomes less likely to happen, for example, by shifting the counter electrode voltage by 0.3 V or more toward the positive polarity from a counter electrode voltage causing the effective voltage having the positive polarity and the effective voltage having the negative polarity, for an identical tone, to be symmetrically applied to the pixel so that the effective voltage having the negative polarity is higher than the effective voltage having the positive polarity to be applied to the pixel.

Also, in this liquid crystal display apparatus, the effective voltages control section may control the effective voltages for an identical tone so that an effective voltage having the positive polarity and an effective voltage having the negative polarity are asymmetrically applied to the pixels between the counter electrodes and the pixel electrodes, even for effective voltages of higher than the first effective voltage, and may reduce asymmetricity for voltages of higher than the first effective voltage.

Namely, the edge burning occurs for low effective. Therefore, when the asymmetricity is reduced for the effective voltages which are higher than the first effective voltages, it is possible that the relation between the effective voltages and the tones gets close to a conventional relation.

Also, in the liquid crystal display apparatus, the effective voltage control section may reduce the asymmetricity as the effective voltage is changed from the lowest effective voltage to a second effective voltage which is higher than the lowest effective voltage.

Accordingly, the asymmetricity is gradually reduced up to the second effective voltage which is higher than the lowest effective voltage. Therefore, it is possible to prevent the movement of the impurities in the liquid crystal panel in lateral directions up to the second effective voltage which causes the asymmetricicty to be maintained, thereby preventing the edge burning.

Further, in this liquid crystal display apparatus, the effective voltage control section may cause the effective voltage having the positive polarity and the effective voltage having the negative polarity to be symmetrically applied to the pixel for an effective voltage which is higher than the second effective voltage.

This allows the relation between the effective voltage and the tone to be the same as the conventional relation for the effective voltage is higher than the second effective voltage.

Further, in the liquid crystal display apparatus, the effective voltage control section may cause the asymmetricity of the effective voltage having the positive polarity and the effective voltage having the negative polarity which are applied to the pixel to become greater from a third effective voltage, which is higher than the second effective voltage and is also higher than half of the maximum effective voltage, to the maximum effective voltage.

This allows preventing the plane burning for low voltages of not higher than the second effective voltage, and for high voltage of higher than the third effective voltage, for both of which voltages the flicker is hard to recognize.

Further, in the liquid crystal display apparatus, the effective voltage control section may cause the effective voltage having the positive polarity and the effective voltage having the negative polarity to be asymmetrically applied to the pixel while an axis of symmetry is shifted toward the opposite polarity, for a fourth effective voltage which is higher than the second effective voltage, and causes the asymmetricity to be small, for an effective voltage which is higher than the fourth effective voltage.

Accordingly, when the effective voltages are asymmetrical in the positive and negative polarities, an axis of asymmetry is once shifted toward the opposite polarity. This allows the flicker to be prevented more surely, as compared to a case where the axis of asymmetry is in the same polarity without being shifted.

Further, in the liquid crystal display apparatus, the effective voltage control section may cause the effective voltage having the positive polarity and the effective voltage having the negative polarity, whose white display luminance is not more than 5% or whose transmittance is not more than 5%, to be asymmetrically applied to the pixel in a normally black mode, whereas the effective voltage having the positive polarity and the effective voltage having the negative polarity, whose white display luminance is not less than about 95% or whose transmittance is not less than about 95%, to be asymmetrically applied to the pixel in a normally white mode.

Namely, the effective voltage having the positive polarity and the effective voltage having the negative polarity, whose white display luminance is not more than about 5% or whose transmittance is not more than about 5%, are asymmetrically applied to the pixel in the normally black mode, whereas the effective voltage having the positive polarity and the effective voltage having the negative polarity, whose white display luminance is not less than about 95% or whose transmittance is not less than about 95%, are asymmetrically applied to the pixel in the normally white mode.

In the above ranges, the effective voltages to be applied to the pixel P are low. Therefore, it is possible to provide a liquid crystal display apparatus which can prevent the edge burning which would occur when a display of a fixed pattern, after having been displayed for a long time, is changed to a half tone display.

In the normally black mode, the range that the white display luminance or the transmittance is not more than about 5% is defined because the flicker is hard to recognize. It is more preferable that the white display luminance or the transmittance is not more than 2%.

On the other hand, in the normally white mode, the range that white display luminance or the transmittance is not less than about 95% is defined because the flicker is hard to recognize. It is more preferable that the white display luminance or the transmittance is not less than about 98%.

Further, in the liquid crystal display apparatus, the effective voltage control section may control the effective voltage by a single polarity driving instead of a polarity inversion driving for a certain pixel voltage region while the effective voltages to be applied to the pixel are asymmetrical.

Namely, the applied voltage may have a single polarity when the counter electrode voltage or the source voltage is largely shifted.

Further, in the liquid crystal display apparatus, the effective voltage control section may shift, for every plural frames or for every plural fields, the counter electrode voltage or the source voltage by 0.3 V or more alternately toward the positive polarity and the negative polarity from an effective voltage causing the voltage having the positive polarity and the voltage having the negative polarity to be symmetrically applied to the pixel, in a certain pixel voltage range.

With this arrangement, the polarities toward which the counter electrode voltage or the source voltage is shifted are alternately changed at a certain interval. This allows preventing of the plane burning.

Further, in the liquid crystal display apparatus, the effective voltage control section may shift the counter electrode voltage or the source voltage alternately toward the positive polarity and the negative polarity at a certain cycle, so that the effective voltage having the positive polarity and the effective voltage having the negative polarity are asymmetrically applied.

With this arrangement, it is possible to carry out the changing of the polarities with a simple circuit because a shift toward the positive polarity and a shift toward the negative polarity are changed alternately at a certain interval.

Further, in the liquid crystal display apparatus, the effective voltage control section may change the counter electrode voltage or the source voltage in sync with turning on the liquid crystal display panel so that the counter electrode voltage or the source voltage alternately or randomly has a shift toward the positive polarity and a shift toward the negative polarity, so as to perform the asymmetrical application of the effective voltage having the positive polarity and the effective voltage having the negative polarity.

With this arrangement, it is possible to carry out the changing of the polarities with a simple circuit because a shift toward the positive polarity and a shift toward the negative polarity are changed alternately or randomly in sync with turning on the liquid crystal display panel 1. Also, it appears to be appropriate to carry out the changing of the polarities in sync with turning on the liquid crystal display panel.

Further, in the liquid crystal display apparatus, the effective voltage control section may shift the counter electrode voltage or the source voltage alternately toward the positive polarity and the negative polarity, while displaying an entire black display, an entire white display, or an entire gray display which includes an single color display of red (R), green (G), and blue (B), or a still image.

Namely, when the changing of polarities is carried out during a normal display including a moving image display, a concern of display malfunction exists. Therefore, it is preferable to carry out the changing of polarities while displaying the entire black display, the entire white display, or the entire gray display which includes a single color display of red (R), green (G), and blue (B), or a still image display.

Further, in the liquid crystal display apparatus, the effective voltage control section may shift the counter electrode voltage or the source voltage alternately toward the positive polarity and the negative polarity in an interval of about one hour to ten days, so that the effective voltage having the positive polarity and the effective voltage having the negative polarity are asymmetrically applied.

Note that a short-term interval of the changing of polarities causes a reduction in effect of preventing the edge burning. However, a long-term interval of the changing of polarities may cause an increase in plane burning.

Therefore, it is preferable that a shift toward the positive polarity and a shift toward the negative polarity are changed alternately in an interval of about one hour to ten days.

Further, in the liquid crystal display apparatus, the effective voltage control section may apply a voltage to a liquid crystal in a pixel between a pair of substrates, i.e., a pixel electrode substrate and a counter substrate in a liquid crystal panel.

This allows providing a general liquid crystal display apparatus including a liquid crystal display panel having a pixel electrode substrate and a counter electrode with a feature that can prevent the edge burning which would occur when a display of a fixed pattern, after having been displayed for a long time, is changed to a half tone display.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is applicable to a VA or a TN type liquid crystal display apparatus in which a voltage having the positive polarity and a voltage having the negative polarity are alternately applied to a pixel between a counter electrode and a pixel electrode, and is applicable to a method for driving the same.

The invention claimed is:

1. A liquid crystal display apparatus in which a voltage having a positive polarity and a voltage having a negative polarity are alternately applied to a pixel between a counter electrode and a pixel electrode, comprising:
   an effective voltage control section that controls effective voltages for an identical tone so that an effective voltage having the positive polarity and an effective voltage having the negative polarity have asymmetrical values to be applied to the pixel,
   the effective voltage control section controls the voltage to be applied to the pixel to (i) have the largest asymmetry for the lowest tone; (ii) the asymmetry is reduced toward a second effective voltage higher than the lowest tone; (iii) an axis of asymmetry is shifted toward the opposite polarity for a fourth effective voltage higher than the second effective voltage; (iv) and then the asymmetry is reduced toward higher voltages, wherein the effective voltage control section shifts a counter electrode voltage or a source voltage by 0.3 V or more from a voltage causing the effective voltages in the positive and the negative polarity to be symmetrically applied to the pixel.

2. The liquid crystal display apparatus as set forth in claim 1, wherein:

the effective voltage control section shifts the counter electrode voltage by 0.3 V or more toward the positive polarity from a voltage causing the effective voltage having the positive polarity and the effective voltage having the negative polarity, for an identical tone, to be symmetrically applied to the pixel so that the effective voltage having the negative polarity is higher than the effective voltage having the positive polarity to be applied to the pixel.

3. A liquid crystal display apparatus in which a voltage having a positive polarity and a voltage having a negative polarity are alternately applied to a pixel between a counter electrode and a pixel electrode, comprising:

an effective voltage control section that controls effective voltages for an identical tone so that an effective voltage having the positive polarity and an effective voltage having the negative polarity have asymmetrical values to be applied to the pixel, for the effective voltages of not more than a first effective voltage which is lower than half of a maximum effective voltage, the effective voltage control section controls the voltage to be applied to the pixel to (i) have the largest asymmetry for the lowest tone; (ii) the asymmetry is reduced toward a second effective voltage higher than the first effective voltage; (iii) an axis of asymmetry is shifted toward the opposited polarity for a fourth effective voltage higher than the second effective voltage; (iv) and then the asymmetry is reduced toward higher voltages, wherein the effective voltage control section shifts a counter electrode voltage or a source voltage by 0.3 V or more from a voltage causing the effective voltages in the positive polarity and the negative polarity to be symmetrically applied to the pixel, for the effective voltages of not more than the first effective voltage.

4. The liquid crystal display apparatus as set forth in claim 3, wherein:

the effective voltage control section controls the effective voltages for an identical tone so that an effective voltage having the positive polarity and an effective voltage having the negative polarity have asymmetrical values to be applied to the pixel, even for effective voltages of higher than the first effective voltage, and reduces asymmetry for voltages of higher than the first effective voltage.

5. A liquid crystal display apparatus in which a voltage having a positive polarity and a voltage having a negative polarity are alternately applied to a pixel between a counter electrode and a pixel electrode, comprising:

an effective voltage control section that controls effective voltages for an identical tone so that an effective voltage having the positive polarity and an effective voltage having the negative polarity are shifted by 0.3 V or more from each other and are asymmetrically applied to the pixel, for a tone at which a minimum effective voltage is applied to the pixel, the effective voltage control section controls the voltage to be applied to the pixel to (i) have the largest asymmetry for the lowest tone; (ii) the asymmetry is reduced toward a second effective voltage higher than the lowest tone; (iii) an axis of asymmetry is shifted toward the opposite polarity for a fourth effective voltage higher than the second effective voltage; (iv) and then the asymmetry is reduced toward higher voltages, and reduces asymmetricity more as a tone is changed from a tone for a lowest effective voltage to a tone corresponding to an effective voltage which is higher than the lowest effective voltage.

6. The liquid crystal display apparatus as set forth in claim 5, wherein:

the effective voltage control section reduces the asymmetricity as the effective voltage is changed from the lowest effective voltage to a second effective voltage.

7. The liquid crystal display apparatus as set forth in claim 6, wherein:

the effective voltage control section causes the effective voltage having the positive polarity and the effective voltage having the negative polarity to be symmetrically applied to the pixel for an effective voltage which is higher than the second effective voltage.

8. The liquid crystal display apparatus as set forth in claim 6, wherein:

the effective voltage control section causes the asymmetricity of the effective voltage having the positive polarity and the effective voltage having the negative polarity which are applied to the pixel to become greater from a third effective voltage, which is higher than the second effective voltage and is also higher than half of a maximum effective voltage, to the maximum effective voltage.

9. The liquid crystal display apparatus as set forth in claim 7, wherein:

the effective voltage control section causes the asymmetricity of the effective voltage having the positive polarity and the effective voltage having the negative polarity which are applied to the pixel to become greater from a third effective voltage, which is higher than the second effective voltage and is also higher than half of a maximum effective voltage, to the maximum effective voltage.

10. The liquid crystal display apparatus as set forth in claim 6, wherein:

the effective voltage control section causes the effective voltage having the positive polarity and the effective voltage having the negative polarity to be asymmetrically applied to the pixel while an axis of symmetry is shifted toward the opposite polarity, for a fourth effective voltage which is higher than the second effective voltage, and causes the asymmetricity to be small, for an effective voltage which is higher than the fourth effective voltage.

11. The liquid crystal display apparatus as set forth in any one claims 1, 3, and 5, wherein:

the effective voltage control section causes the effective voltage having the positive polarity and the effective voltage having the negative polarity, whose white display luminance is not more than 5% or whose transmittance is not more than 5%, to be asymmetrically applied to the pixel in a normally black mode, whereas the effective voltage having the positive polarity and the effective voltage having the negative polarity, whose white display luminance is not less than about 95% or whose transmittance is not less than about 95%, to be asymmetrically applied to the pixel in a normally white mode.

12. The liquid crystal display apparatus as set forth in any one of claims 1, 3, and 5, wherein:
the effective voltage control section controls effective voltage by a single polarity driving instead of a polarity inversion driving for a certain pixel voltage region while the effective voltages to be applied to the pixel are asymmetrical.

13. The liquid crystal display apparatus as set forth in any one of claims 1, 3 and 5, wherein;
the effective voltage control section shifts, for every plural frames or for every plural fields, the counter electrode voltage or the source voltage by 0.3 V or more alternately toward the positive polarity and the negative polarity from an effective voltage causing the voltage having the positive polarity and the voltage having the negative polarity to be symmetrically applied to the pixel, in a certain pixel voltage range.

14. The liquid crystal display apparatus as set forth in any one of claims 1, 3, or 5, wherein:
the effective voltage control section shifts the counter electrode voltage or the source voltage alternately toward the positive polarity and the negative polarity at a certain cycle, when the effective voltage having the positive polarity and the effective voltage having the negative polarity are asymmetrically applied.

15. The liquid crystal display apparatus as set forth in any one of claims 1, 3, or 5, wherein:
the effective voltage control section changes the counter electrode voltage or the source voltage in sync with turning on the liquid crystal display panel so that the counter electrode voltage or the source voltage alternately or randomly has a shift toward the positive polarity and a shift toward the negative polarity, so as to perform the asymmetrical application of the effective voltage having the positive polarity and the effective voltage having the negative polarity.

16. The liquid crystal display apparatus as set forth in any one of claims 1, 3, or 5, wherein:
the effective voltage control section shifts the counter electrode voltage or the source voltage alternately toward the positive polarity and the negative polarity, while displaying an entire black display, an entire white display, or an entire gray image which includes an single color display of red (R), green (G), blue (B), or a still image display.

17. The liquid crystal display apparatus as set forth in any one of claims 1, 3, or 5, wherein:
the effective voltage control section shifts the counter electrode voltage or the source voltage alternately toward the positive polarity and the negative polarity in an interval of about one hour to ten days, so that the effective voltage having the positive polarity and the effective voltage having the negative polarity are asymmetrically applied.

18. The liquid crystal display apparatus as set forth in any one of claims 1, 3, or 5, wherein:
the effective voltage control section applies a voltage to a liquid crystal in a pixel between a pair of substrates, i.e., a pixel electrode substrate and a counter substrate in a liquid crystal panel.

19. A method for driving a liquid crystal display apparatus in which a voltage having a positive polarity and a voltage having a negative polarity are alternately applied to a pixel between a counter electrode and a pixel electrode, comprising the steps of:
controlling effective voltages for an identical tone so that an effective voltage having the positive polarity and an effective voltage having the negative polarity have asymmetrical values to be applied to the pixel;
controlling the voltage to be applied to the pixel to (i) have the largest asymmetry for the lowest tone; (ii) the asymmetry is reduced toward a second effective voltage higher than the lowest tone; (iii) an axis of asymmetry is shifted toward the opposite polarity for a fourth effective voltage higher than the second effective voltage; (iv) and then the asymmetry is reduced toward higher voltages; and
shifting a counter electrode voltage or a source voltage by 0.3 V or more from a voltage causing the effective voltages in the positive polarity and the negative polarity to be symmetrically applied to the pixel.

20. A method for driving a liquid crystal display apparatus in which a voltage having the positive polarity and a voltage having the negative polarity are alternately applied to a pixel between a counter electrode and a pixel electrode, comprising the steps of:
controlling effective voltages for an identical tone so that an effective voltage having the positive polarity and an effective voltage having the negative polarity have asymmetrical values to be applied to the pixel, for the effective voltages of not more than a first effective voltage which is lower than half of a maximum effective voltage; and
the effective voltage control section controls the voltage to be applied to the pixel to (i) have the largest asymmetry for the lowest tone; (ii) the asymmetry is reduced toward a second effective voltage higher than the lowest tone; (iii) an axis of asymmetry is shifted toward the opposite polarity for a fourth effective voltage higher than the second effective voltage; (iv) and then the asymmetry is reduced toward higher voltages; and
shifting a counter electrode voltage or a source voltage by 0.3 V or more from a voltage causing the effective voltages in the positive polarity and the negative polarity to be symmetrically applied to the pixel.

21. A method for driving a liquid crystal display apparatus in which a voltage having a positive polarity and a voltage having a negative polarity are alternately applied to a pixel between a counter electrode and a pixel electrode, comprising the steps of:
controlling effective voltages for an identical tone so that an effective voltage having the positive polarity and an effective voltage having the negative polarity are shifted by 0.3 V or more from each other and are asymmetrically applied to the pixel, for a tone at which a minimum effective voltage is applied to the pixel;
controlling the voltage to be applied to the pixel to (i) have the largest asymmetry for the lowest tone; (ii) the asymmetry is reduced toward a second effective voltage higher than the lowest tone; (iii) an axis of asymmetry is shifted toward the opposite polarity for a fourth effective voltage higher than the second effective voltage; (iv) and then the asymmetry is reduced toward higher voltages; and
reducing asymmetricity more as a tone is changed from a tone for a lowest effective voltage to a tone corresponding to an effective voltage which is higher than the lowest effective voltage.

* * * * *